US007428980B2

(12) United States Patent
Irwin et al.

(10) Patent No.: US 7,428,980 B2
(45) Date of Patent: Sep. 30, 2008

(54) PARCEL COLLECTION DEVICE

(75) Inventors: Donald E. Irwin, Fredericksburg, VA (US); Daniel A. Wilson, Fairfax Station, VA (US); F. Andrew Better, Oak Hill, VA (US); Edgar T. Bellinger, Jr., Bethesda, MD (US); Duane C. Hajos, Rockville, MD (US)

(73) Assignee: United States Postal Service, Washington, DC (US)

( * ) Notice: Subject to any disclaimer, the term of this patent is extended or adjusted under 35 U.S.C. 154(b) by 54 days.

(21) Appl. No.: 11/192,044

(22) Filed: Jul. 29, 2005

(65) Prior Publication Data

US 2006/0169762 A1 Aug. 3, 2006

Related U.S. Application Data

(60) Provisional application No. 60/645,134, filed on Jan. 19, 2005, provisional application No. 60/592,127, filed on Jul. 30, 2004.

(51) Int. Cl.
*B65G 11/04* (2006.01)

(52) U.S. Cl. .............................. 232/45; 232/49; 232/51

(58) Field of Classification Search ................... 232/45, 232/49–52, 34; 340/569
See application file for complete search history.

(56) References Cited

U.S. PATENT DOCUMENTS

| | | | | | |
|---|---|---|---|---|---|
| 555,948 | A | * | 3/1896 | Harrison et al. | 232/49 |
| 561,589 | A | * | 6/1896 | Hower | 232/49 |
| 570,628 | A | * | 11/1896 | Gascchlin | 232/49 |
| 652,916 | A | * | 7/1900 | Kline | 232/51 |
| 1,299,737 | A | * | 4/1919 | Koleta | 232/49 |
| 3,519,198 | A | * | 7/1970 | Benoliel | 232/17 |
| 3,784,090 | A | * | 1/1974 | Markham | 232/44 |
| 4,794,377 | A | * | 12/1988 | Benages | 340/569 |
| 5,060,854 | A | * | 10/1991 | Armstrong | 232/37 |
| 5,624,071 | A | * | 4/1997 | Sosan | 232/17 |
| 6,719,195 | B2 | * | 4/2004 | Farentinos | 232/45 |
| 6,918,534 | B2 | * | 7/2005 | Fitzgibbons et al. | 232/50 |

OTHER PUBLICATIONS

Notification of Transmittal of the International Search Report and The Written Opinion of the International Searching Authority in International Application No. PCT/US05/27233 (15 pages).

* cited by examiner

*Primary Examiner*—William L. Miller
(74) *Attorney, Agent, or Firm*—Finnegan, Henderson, Farabow, Garrett & Dunner, L.L.P.

(57) ABSTRACT

An apparatus for receiving parcels having a structural frame and a parcel drop having a fully open and a fully closed position is disclosed. The apparatus includes a bin, a first opening between the bin and the structural frame through which patrons may deposit parcels into the bin at least when the parcel drop is in the fully open position. The apparatus further includes a second opening within the bin through which deposited parcels may fall out of the bin at least when the parcel drop is in the fully closed position. The parcel drop is rotatably coupled to the structural frame.

27 Claims, 21 Drawing Sheets

FIG. 16
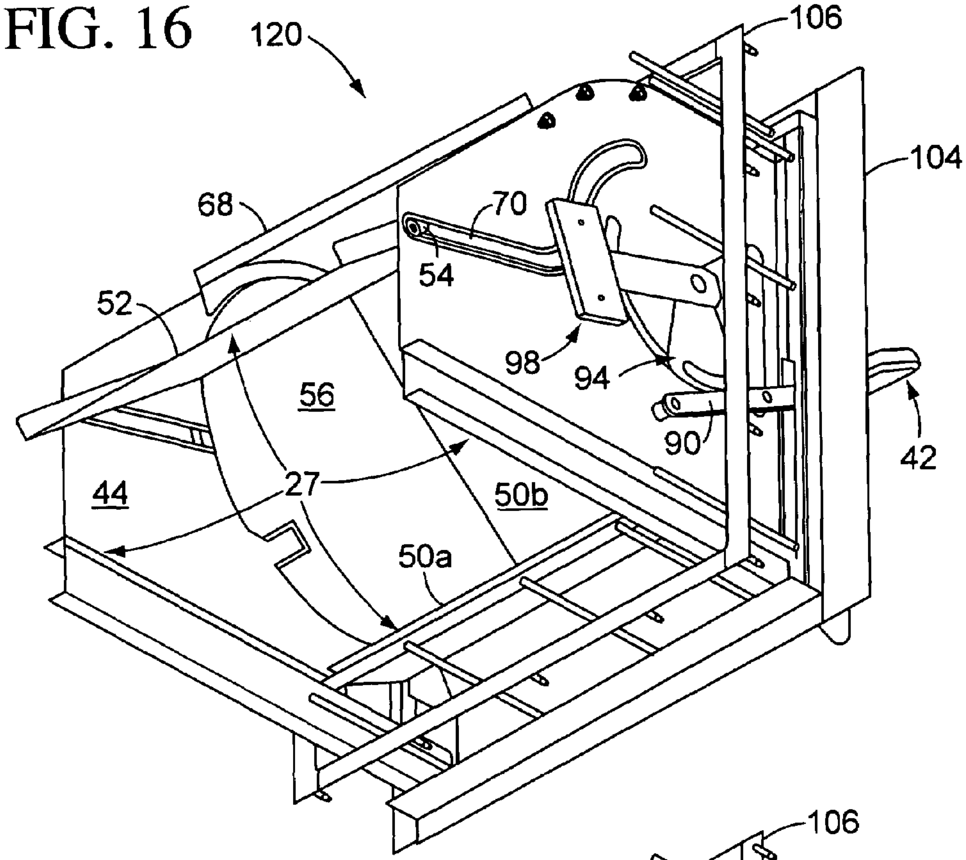
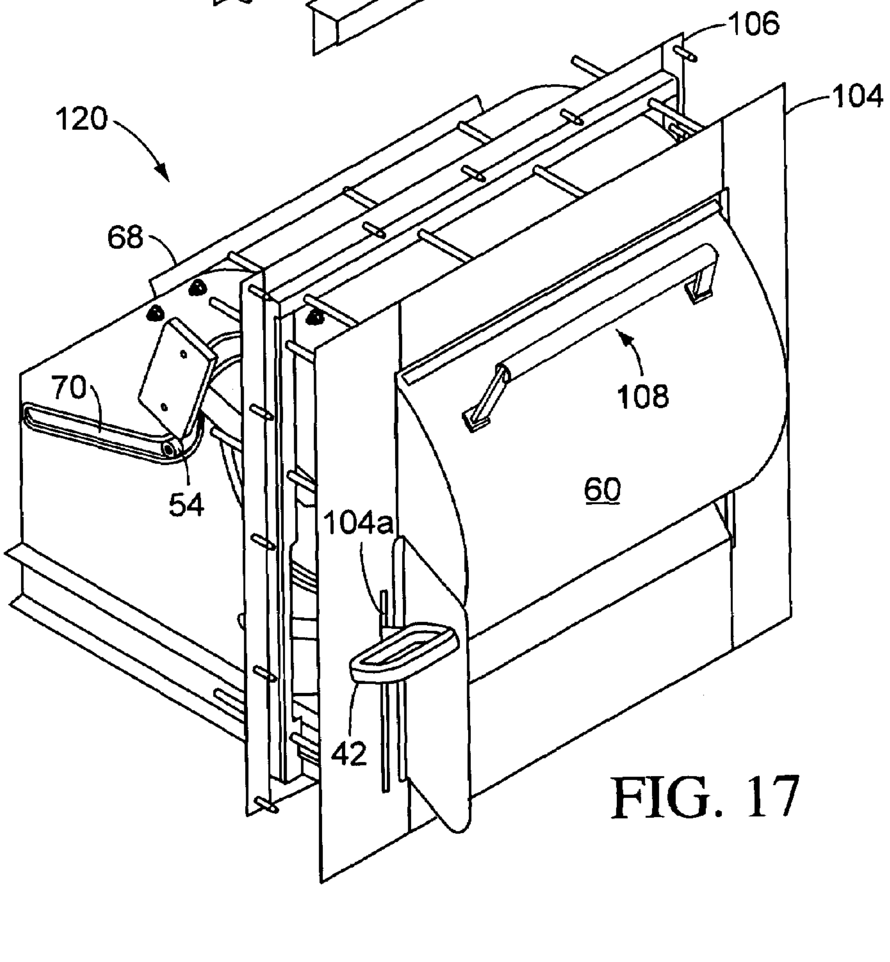
FIG. 17

PARCEL COLLECTION DEVICE

CROSS REFERENCE TO RELATED APPLICATIONS

This application claims the benefit of priority under 35 U.S.C. § 119 of U.S. Provisional Applications No. 60/592,127, filed on Jul. 30, 2004, and No. 60/645,134, filed on Jan. 19, 2005, both of which are expressly incorporated herein by reference.

BACKGROUND

Technical Field

Embodiments disclosed herein relate to an apparatus for securely collecting parcels. The apparatus may be manually operated with no internal energy source, with as little as 5 pounds of manually applied force, and with the lowest point of access for depositing parcels into the apparatus being no more than 48 inches from the ground.

The Americans with Disabilities Act ("ADA") requires that parcel collection boxes or wall units, inter alia, be operable with forces and be accessible at heights and distances that were determined not to create difficulties for disabled users. Self service platform parcel collection boxes and wall units have been designed with these requirements in mind.

SUMMARY

As embodied and broadly described herein, an embodiment consistent with the invention is an apparatus for receiving parcels comprising a structural frame and a parcel drop. The parcel drop comprises a bin, means for creating a first opening between the bin and the structural frame through which patrons may deposit parcels into the bin at least when the parcel drop is fully open, and means for creating a second opening within the bin through which deposited parcels may fall out of the bin at least when the parcel drop is rotated from fully open to fully closed. The parcel drop is rotatably coupled to the structural frame.

Another embodiment of an apparatus for receiving parcels comprises a structural frame and a parcel drop coupled to the structural frame. The parcel drop comprises a bin and a bin rotating mechanism. The bin rotating mechanism comprises a handle external to the structural frame that requires no more than five pounds of force tangentially applied in the direction of rotation to rotate in either direction.

Another embodiment consistent with the invention is a method of using a parcel collecting apparatus comprising depositing a parcel of up to 12 by 14 by 20 inches in dimension into an open top bin, and rotating a handle with a force of five pounds or less.

Another embodiment consistent with the invention is a method of securely collecting parcels comprising forming a first opening between a parcel drop and a structural frame within which the parcel drop is mounted, placing a parcel into the first opening, eliminating the first opening, and creating a second opening within the parcel drop, after the first opening has sufficiently diminished in size to prevent easy access into a parcel collection location, through which second opening the parcel falls.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments consistent with the invention and together with the description, serve to explain the principles of the invention. In the drawings.

FIG. 16 illustrates a bottom-back-left perspective view of the embodiment illustrated in FIG. 9;

FIG. 17 illustrates a front-top-left perspective view of the embodiment illustrated in FIG. 9 in the position illustrated in FIG. 13.

DESCRIPTION OF EMBODIMENTS

Reference will now be made in detail to the exemplary embodiments consistent with the invention, examples of which are illustrated in the accompanying drawings. Wherever possible, the same reference numbers will be used throughout the drawings to refer to the same or like parts.

Figure 1:
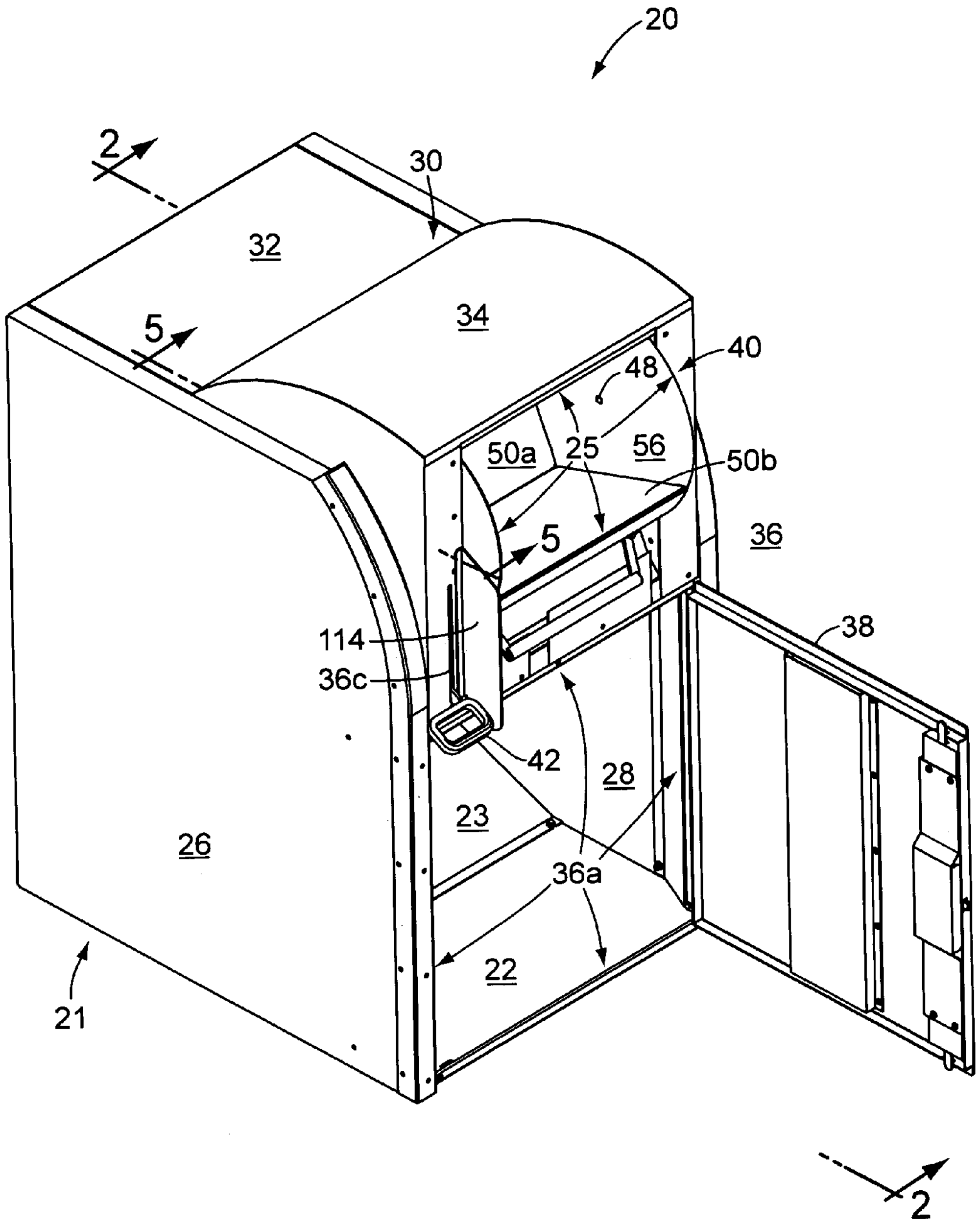
FIG. 1 illustrates a perspective view of a self-service parcel collection box with a parcel drop in the fully open position.

One embodiment of a device for securely collecting patron-deposited parcels consistent with the invention is illustrated in FIG. 1. Patrons, including those in wheelchairs, may operate parcel collection box 20 by placing parcels in parcel drop 40 through an opening 25 formed between parcel drop 40 and structural frame 21, and then rotating a parcel drop 40 to the fully closed position (accomplished in this embodiment by rotating a handle 42 upward), which eliminates opening 25 and deposits the parcel into the interior of parcel collection box 20. When handle 42 is rotated upward, parcels are deposited into the interior of parcel collection box 20 by falling through an opening 27 (illustrated best in FIGS. 15 and 16) created in parcel drop 40 at least when parcel drop 40 is in its fully closed position. In this embodiment, handle 42 requires no more than five pounds to move, the lowest height of the opening of parcel drop 40 is no more than forty-eight inches from the surface upon which parcel collection box 20 rests and no part of parcel collection box 20 extends more than 4" from the front vertical face. Accordingly parcel collection box 20, as here embodied, complies with ADA requirements as of the time of filing. As here embodied, parcel drop 40 may receive parcels 14" by 12" by 20" in size.

Figure 2:
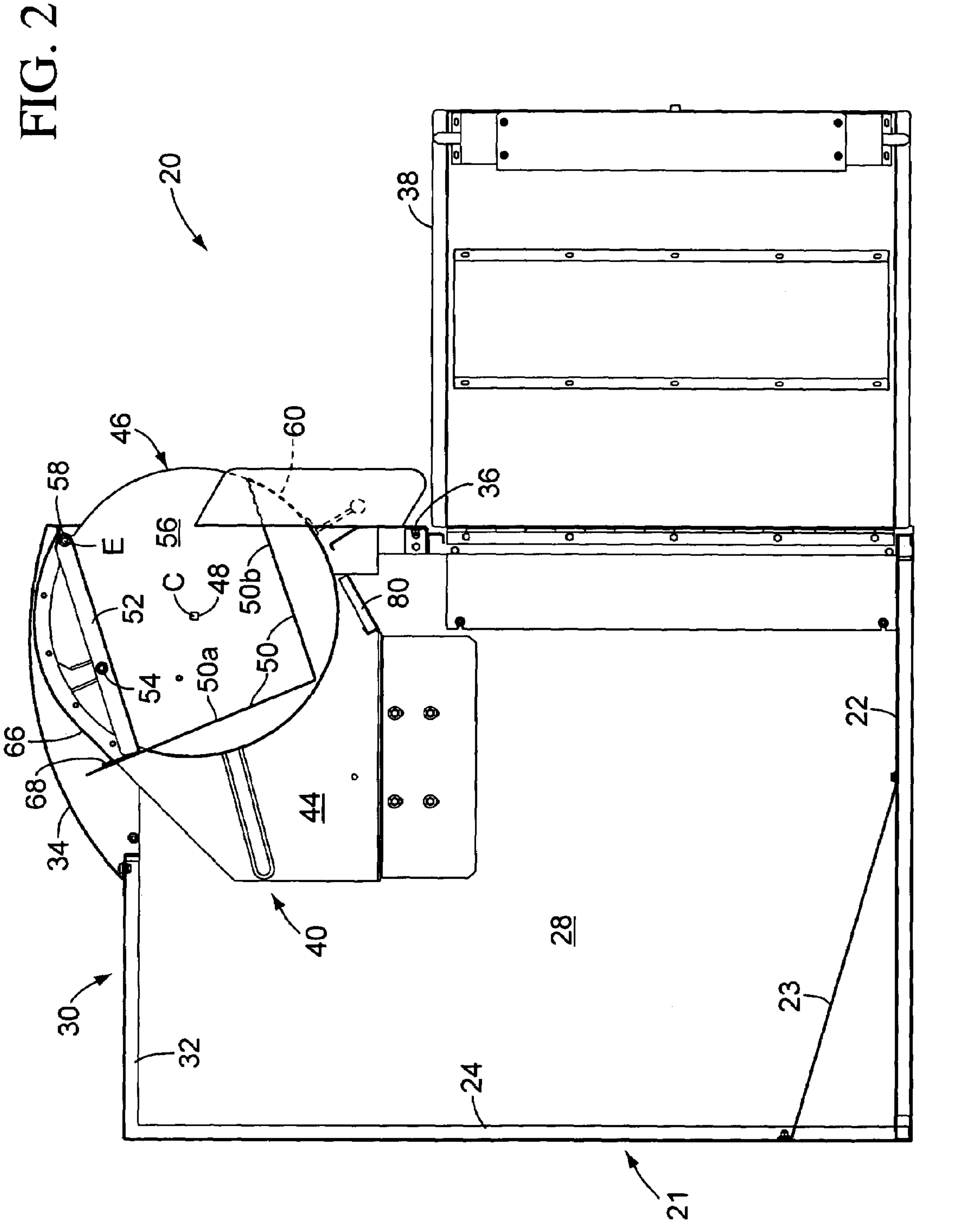
FIG. 2 illustrates a cross-section of the parcel collection box illustrated in FIG. 1 along line 2-2 of FIG. 1.

A parcel collection device consistent with the invention includes a structural frame. In this embodiment, as best illustrated in FIGS. 1 and 2, structural frame 21 comprises a base 22 with a ramp 23 located over at least a portion of base 22 with the high point of ramp 23 disposed toward the back of the base 22 and the low point of ramp 23 is disposed toward the front of ramp 23. As here embodied, back wall 24 shown in FIG. 2 connects with a left sidewall 26 and right sidewall 28 (shown in FIG. 2). Structural frame 21 may also include a top structure 30. Top structure 30 may comprise a planar wall 32, which may be contiguously connected to back wall 24 and left sidewall 26 and right sidewall 28 and may include a generally cylindrical hood 34, rising partially above the horizontal plane of planar wall 32. In this embodiment the front wall 36 may have three openings 36*a*, 36*b*, and 36*c*, and thus, structural frame 21 may also have a door 38 for covering opening 36*a*.

A parcel collection device consistent with the invention includes a parcel drop. Parcel drop 40, as here embodied, includes a bin 46 (best depicted in FIGS. 2 & 3), a cover 60 (best depicted in FIG. 2), a housing 62 (best depicted in FIG. 3), apparatus to rotate parcel drop 40 between the fully open and fully closed positions (depicted in FIGS. 5, 6, 7, and 8), an apparatus to create an opening 25 through which to place parcels into bin 46 at least when parcel drop 40 is in the fully open position (depicted in FIGS. 5, 6, 7, and 8), and an apparatus to create an opening 27 through which a parcel may fall into the interior of structural frame 21 at least when parcel drop 40 is in the fully closed position (depicted in FIGS. 7, 8, and 13-16).

Figure 3:
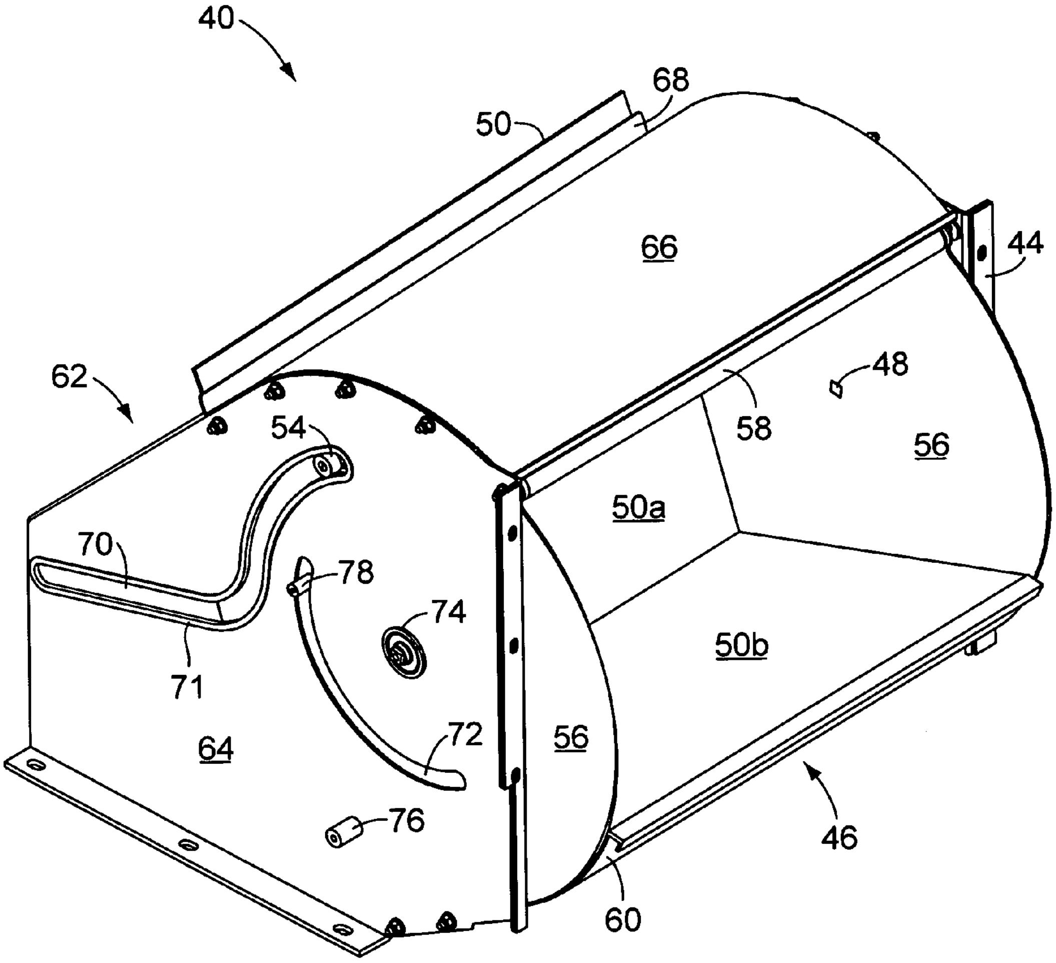
FIG. 3 illustrates a perspective view of a subassembly of the parcel collection box illustrated in FIG. 1.
Figure 4:
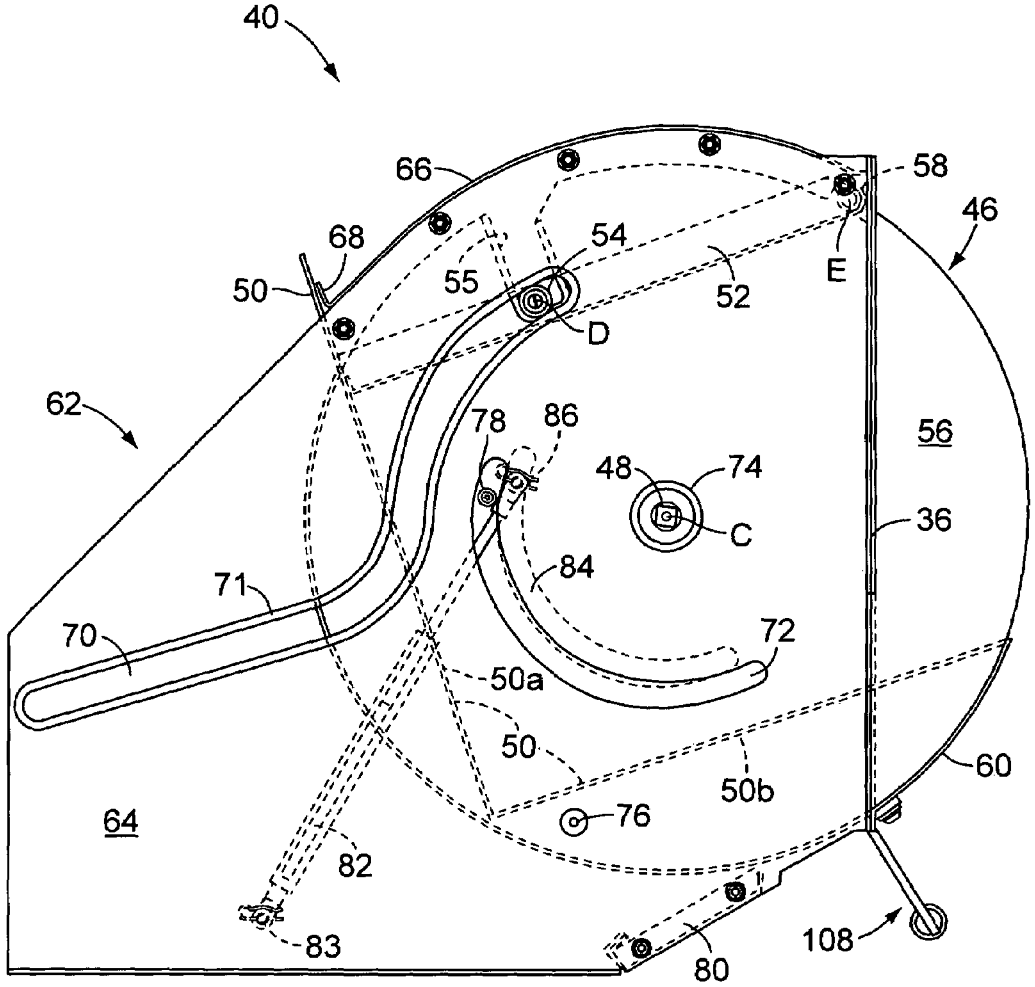
FIG. 4 illustrates a side view of the subassembly illustrated in FIG. 3.

FIG. 3 illustrates bin 46, a cover 60, and a housing 62 of parcel drop 40. Bin 46, as here embodied, comprises a chute 50, a trap door 52 (shown in FIG. 2), and two end plates 56. As here embodied, chute 50 is L-shaped where the longer section forms the bottom wall 50*a* of bin 46 and the shorter section forms the front wall 50*b* of bin 46 (best depicted in FIG. 2). In this embodiment, chute 50 is 20.50 inches wide, longer section 50*a* is 16.855 inches long, and shorter section 50*b* is 14.389 inches long and form an interior angle of 94 degrees. Chute 50 may be made of 13 gage stainless steel sheet stock or other structurally rigid material. Chute 50 may be contiguously connected to end plates 56 (best depicted in FIGS. 3 and 4), which, in this embodiment, are generally circular. In this embodiment, end plates 56 have a diameter of 19.75 inches. End plates 56 form sidewalls of bin 46. In the fully open position of parcel drop 40, as shown in the embodiment of FIGS. 2 and 4, trap door 52 forms right angles to end plates 56 and is parallel to shorter section 50*b* of chute 50, forming a back wall of bin 46. As shown in FIGS. 2 and 4, trap door 52 has a small clearance between its bottom edge and chute 50. In this embodiment the clearance is about 0.01 inches. Trap door 52 may be rotatably connected by a shaft 58 at point E to end plates 56.

As here embodied, bin 46 is contiguously connected to a cover 60, which may be semi-cylinder-shaped. Cover 60 may be welded along its side edges to each end plate 56 and along its front and back edges to chute 50. The outer surface of cover 60 may be designed to be close to opening 36*b* in structural frame 21 while cover 60 rotates.

Figure 10:
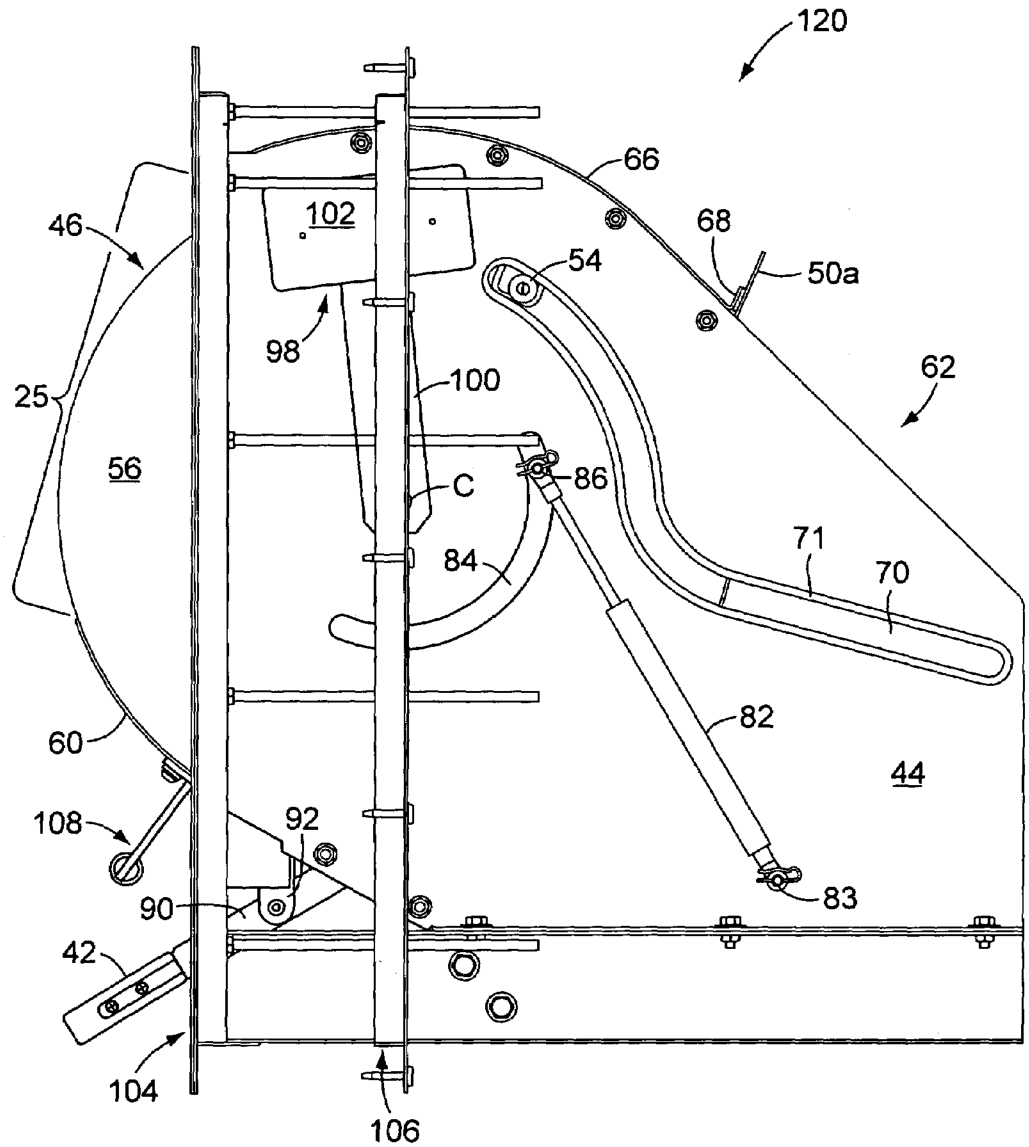
FIG. 10 illustrates a right-side view of the embodiment of the parcel collection box illustrated in FIG. 9.

Housing 62 comprises left hand housing plate 64, right hand housing plate 44, an upper housing support 66 and a lower housing support 80 (best depicted in FIGS. 2 & 4) both connecting housing plates 44 and 64. Flange 68 may be a part of upper housing support 66 and may function as a stop against which part of chute 50 rests in the "fully open" position of parcel drop 40. Housing plate 64 contains a trap door roller slot 70, a first pin slot 72, a circular bin shaft opening 74 centered about point C, and a handle lever mounting shaft 76. Housing plate 44 (best depicted in FIG. 10) also contains a trap door roller slot 70, a circular bin shaft opening 74 centered about point C, and a spring pin slot 84 and a spring mounting shaft 83 (best depicted in FIGS. 4 & 10).

FIG. 2 illustrates parcel drop 40 mounted within structural frame 21. Housing plates 44 and 64 are attached by bolts or other means to extensions of the structural frame 21. Bin 46 may be rotatably mounted within housing plates 44 and 64 by two bin-rotating shafts 48, the square-shaped end of one of which can be see in FIGS. 2, 3, and 4. Each bin rotating shaft 48 may be fixedly connected to an end plate 56 at point C by pressfitting a keyed end of shaft 48 into end plate 56. Shaft 48 may have a circular cross section except for its keyed ends, which as here embodied, are square-shaped. Shaft 48 may be rotatably mounted within bearings installed in bin shaft opening 74 in each housing plate 44 and 64.

FIG. 4 further illustrates certain components of housing 62 and bin 46. Specifically, housing plate 64, upper housing support 66, flange 68, (part of) end plate 56, (part of) cover 60, (part of) chute 50, (part of) trap door 52, trap door roller 54, shaft 48, and a bin pin 78 are directly visible. Left housing plate 64 includes trap door roller slot 70, the perimeter of which may be covered with lining 71, first pin slot 72, bin shaft opening 74, bin rotating shaft 48 at point C, and input lever mounting shaft 76. Illustrated in hidden line is part of cover 60, chute 50, and trap door 52. In complete hidden line is trap door rotating shaft 58, lower housing support 80, a constant force spring 82 rotatably mounted to the right housing plate 44, which also contains a spring pin slot 84 on housing plate 44 and a spring pin 86 fixedly connected to right hand end plate 56 and rotatably connected to constant force spring 82.

As previously disclosed, parcel collection box 20 operates by rotation of parcel drop 40 within structural frame 21. Several components combine to produce this rotation. In this embodiment, a modified four bar mechanism (best depicted in FIGS. 5 & 6) converts an input rotation of input lever 90 into rotation of bin 46. In this embodiment, the four "bars" are input lever 90, linkage 92, bin lever 94, and housing plate 64. The four bar mechanism may move bin 46 by contact with bin pin 78, which may be fixedly connected to end plate 56 of bin 46 and extend through first pin slot 72 of housing plate 64.

Figure 5:
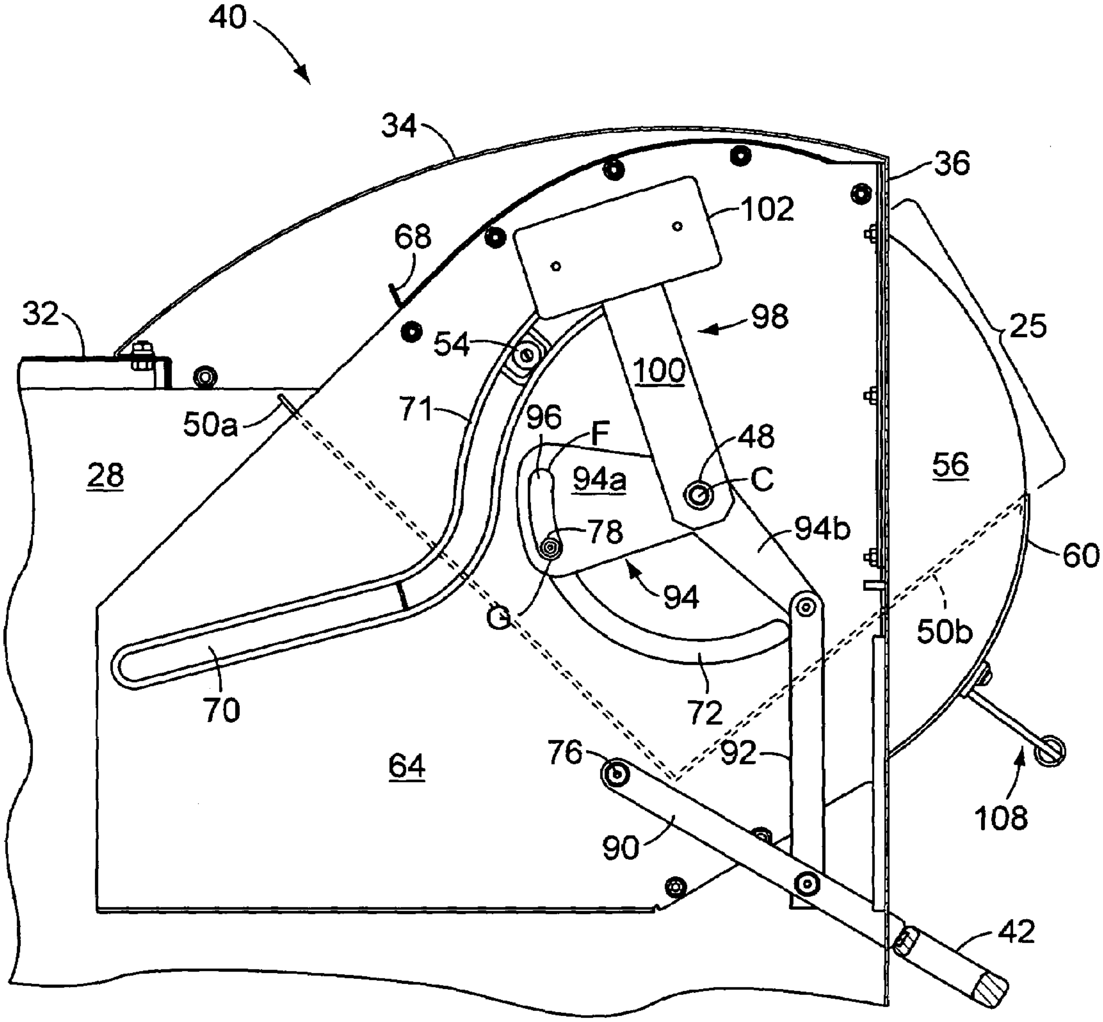
FIG. 5 illustrates a cross-section along line 5-5 of the parcel collection box illustrated in FIG. 1, when lever 90 is at the bottom of its stroke in slot 36*c;*
Figure 6:
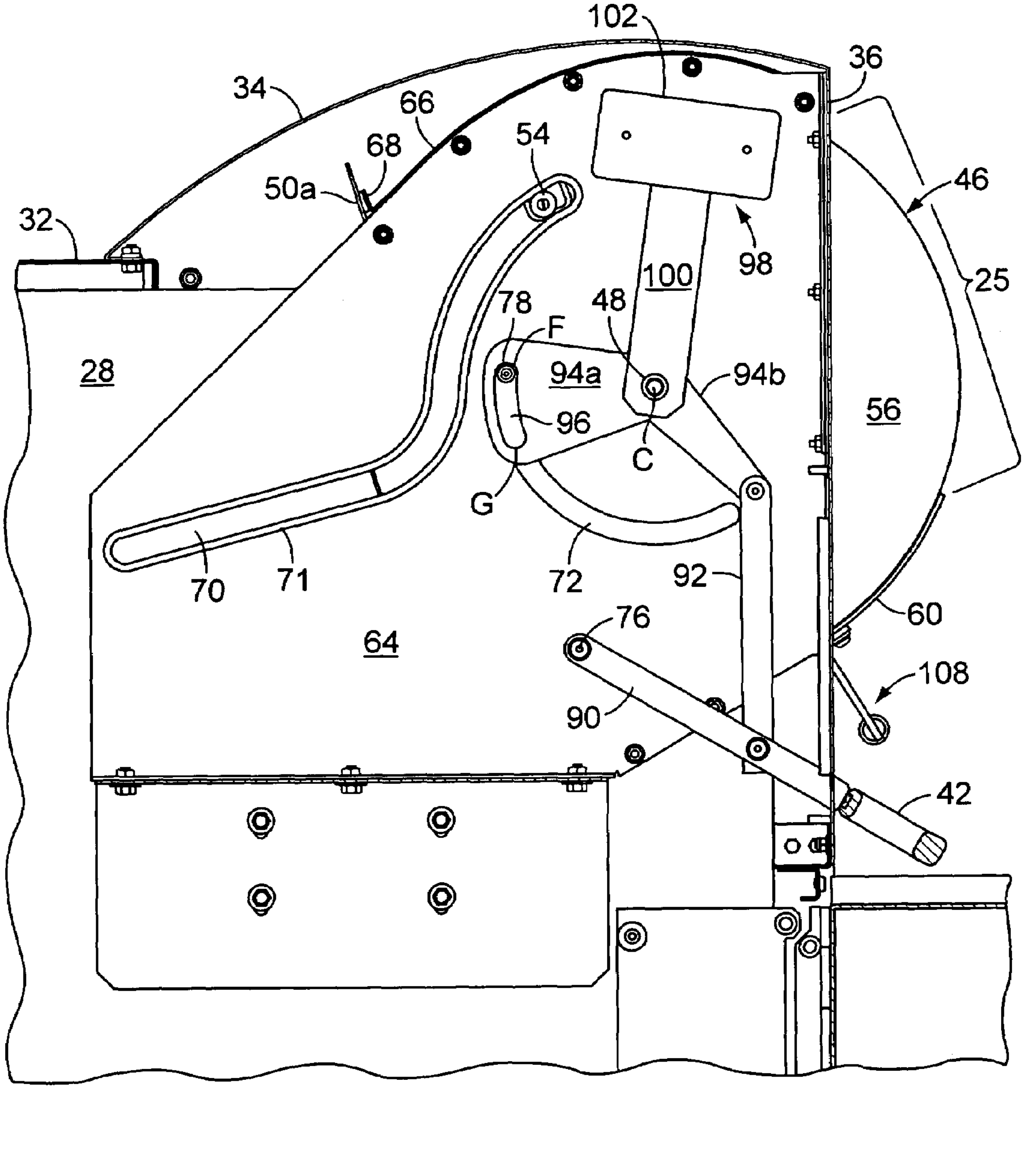
FIG. 6 illustrates the same view as FIG. 5, when bin 46 has continued to rotate clockwise to the fully open position.

As here embodied, and depicted in FIGS. 5 and 6, bin roller pin 78 is in contact with either point F or G of bin pin slot 96 within a portion 94*a* of bin lever 94. In this embodiment, slot 96 is a 25 degree arc-shaped slot that allows the bin to rotate 25 degrees more than bin lever 94 travels. Bin lever 94 may rotate on bin rotating shaft 48, relative to it and housing plate 64. Portion 94*a* may be at least as long as distance between the centers of shaft 48 and bin rotating pin 78, which is 5.03 inches in this embodiment. In this embodiment, the center line of portion 94*a* is a fixed angle away from the centerline of a portion 94*b* of bin lever 94. In this embodiment, that angle is approximately 128 degrees. Portion 94*b* may rotate on shaft 48 and extend to the center of the shaft that connects bin lever 94 to a linkage 92. In this embodiment, that distance between the centers of shaft 48 and the center of the shaft connecting bin lever 94 and linkage 92 is 4.750 inches. Bin lever 94 may be any shape that retains these spatial relationships, and may be scaled to accommodate larger or smaller input motions.

Linkage 92 may be rotatably connected to bin lever 94 by a shaft, and to input lever 90 by another shaft. In this embodiment, the distance between the two shafts in linkage 92 is 8.5 inches. Linkage 92 may be any shape that retains these spatial relationships, and may be scaled to accommodate larger or smaller input motions.

Input lever 90 may be rotatably connected, as described above, by a shaft, to linkage 92. Input lever 90 may be also rotatably connected to housing plate 64 by lever mounting shaft 76. In this embodiment, the center axis of shaft 76 intersects housing plate 64 at a 8.904 inches radius from point C at 254 degrees counter clockwise from 0 degrees (at horizontal). Input lever 90 extends at least between the centers of shaft 76 and the shaft connecting input lever 90 to linkage 92. In this embodiment, that distance is 6.75 inches. Input lever 90 may be longer than that distance. As here embodied, it protrudes through slot 36*c* (shown in FIG. 1) in front wall, in order to provide a lever which patrons may rotate to rotate parcel drop 40. The longer the lever, the greater the moment arm and the less force required to rotate parcel drop 40. Input lever 90 may be any shape that retains these spatial relationships, and meets the ADA limits, if required.

Because, as here embodied, housing plate 64 is between bin 46 and input lever 90, a first pin slot 72 must exist in housing plate 64. Slot 72 may be sized as desired with the minimum size limitation corresponding to the diameter of the bin roller pin 78 and the desired number of degrees of rotation at bin roller pin's radius from point C. In this embodiment, slot 72 is an 0.75 inch wide, approximately 125 degrees arc-shaped slot at a 5.03 inch centerline radius from point C.

A handle 42 may be connected to input lever 90. In this embodiment, handle 42 extends at most 4 inches from the exterior surface of front wall 36 of parcel collection box 20 at all times during operation. In this embodiment, input lever 90 at the point it crosses front wall 36 of structural frame 21 travels 11 vertical inches as it rotates 60 degrees, producing 90 degrees of rotation of bin 46. As here embodied, however, bin 46 rotates 115 degrees between fully open and fully closed positions of parcel drop 40. In this embodiment, the extra 25 degrees is provided by the combination of slot 96, constant force spring 82 and counterweights 98.

Constant force spring 82 (best shown in FIG. 10) serves the purpose of providing a force to help fully close and fully open parcel drop 40. Constant force spring 82 may be rotatably connected to spring pin 86 and spring mounting shaft 83. In this embodiment, spring mounting shaft 83 is fixedly connected to housing plate 44 at a point 11.25 inches to the right of point C and 11.25 inches below point C when looking at point C on the right hand side of embodiment 120. As here embodied, spring pin 86 is fixedly connected to the other end plate 56 of bin 46 and extends through spring pin slot 84 of housing plate 44. Only because constant force spring 82, in this embodiment, is on the other side of housing plate 44 than end plate 56, is spring pin slot 84 necessary. Spring pin slot 84, as here embodied, is a 0.750 inch wide, approximately 125 degree arc of centerline radius 4.375 inches from point C. Constant force spring 82 applies a force at pin 86 that resists the rotation of bin 46 at the beginning of each direction as spring 82 is compressed while the distance between spring mounting shaft 83 and spring pin 86 decreases, but then provides a constant force which assists the rotation of bin 46 as it expands while the distance between spring mounting shaft 83 and spring pin 86 increases. Constant force spring 82 is preferably a 20 pound extension force gas spring.

Counterweights 98 on either side of bin 46 contribute to the rotation of bin 46. FIG. 5 illustrates counterweight 98 fixedly connected to a keyed end of bin rotating shaft 48. Counterweight 98 may be formed by vertical portion 100 and horizontal portion 102 welded together in a general T-shape. In this embodiment, vertical portion 100 is 10.0 inches long, 2.00 inches wide and 0.1793 inches thick constructed of hot rolled steel strip and horizontal portion 102 is 6.00 inches wide, 3.00 inches tall, and 0.500 inches thick constructed of hot rolled, flat, steel bar. Horizontal portion 102 may be welded to vertical portion 100 such that the bottom edge is 7.50 inches from the bottom edge of vertical portion 100. In practice, small amounts of mass may need to be added or removed from counterweights 98 to obtain the 5 pound maximum force to rotate handle 42. Counterweight 98 may have alternate shapes and be constructed of alternate materials. To be ADA compliant, the moment of inertia and weight should be equivalent to counterweight 98 as embodied here.

As illustrated in FIG. 5, in this embodiment, when input lever 90 is in its bottom-most position, counterweights 98 are positioned 18 degrees short of top dead center and thus inertia, and the force of constant force spring 82 continues to rotate them clockwise and bin 46 further clockwise, moving bin pin 78 twenty-five more degrees from point G to point F on slot 96 in bin lever 94. Thus when bin 46 stops rotating open, counterweights 98 are 7 degrees past top dead center or 83 degrees from horizontal as shown in FIG. 6.

Figure 11:
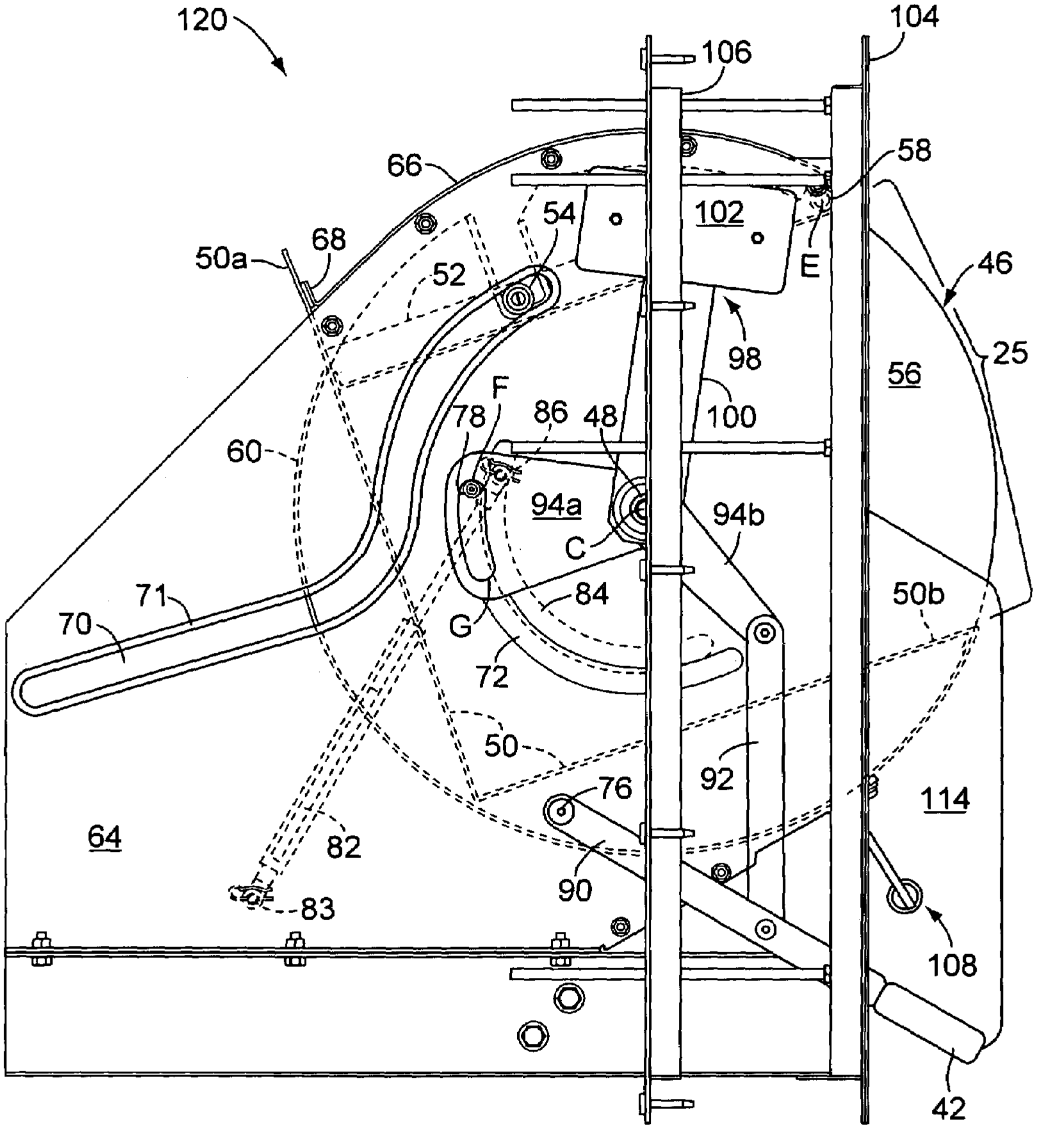
FIG. 11 illustrates the embodiment illustrated in FIG. 9, in the same position as the embodiment illustrated in FIG. 6.

Thus FIGS. 6 and 11 illustrate both the final resting position of components in the fully open position of parcel drop 40 and the starting position for rotating parcel drop 40 counter-clockwise to the fully closed position. Thus, when a patron rotates handle 42 sixty degrees up from the bottom to "close" parcel drop 40, the four bar mechanism rotates bin lever 94, which, because of the constant force spring 82 and the counterweights is already in contact with bin pin 78 at point F, and rotates bin 46 counterclockwise 90 degrees.

Figure 7:
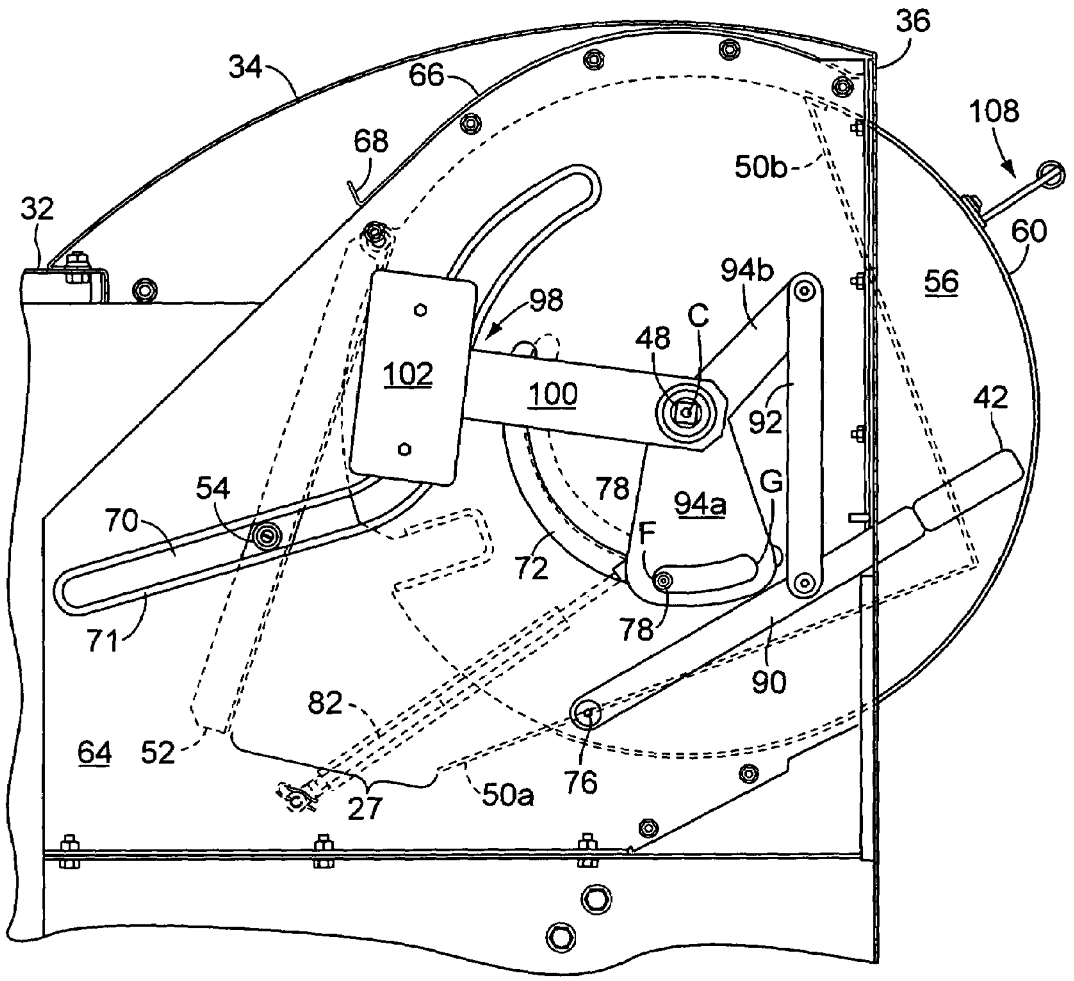
FIG. 7 illustrates the same view as FIGS. 5 & 6, with lever 90 at the top of its stroke in slot 36*c;*
Figure 13:
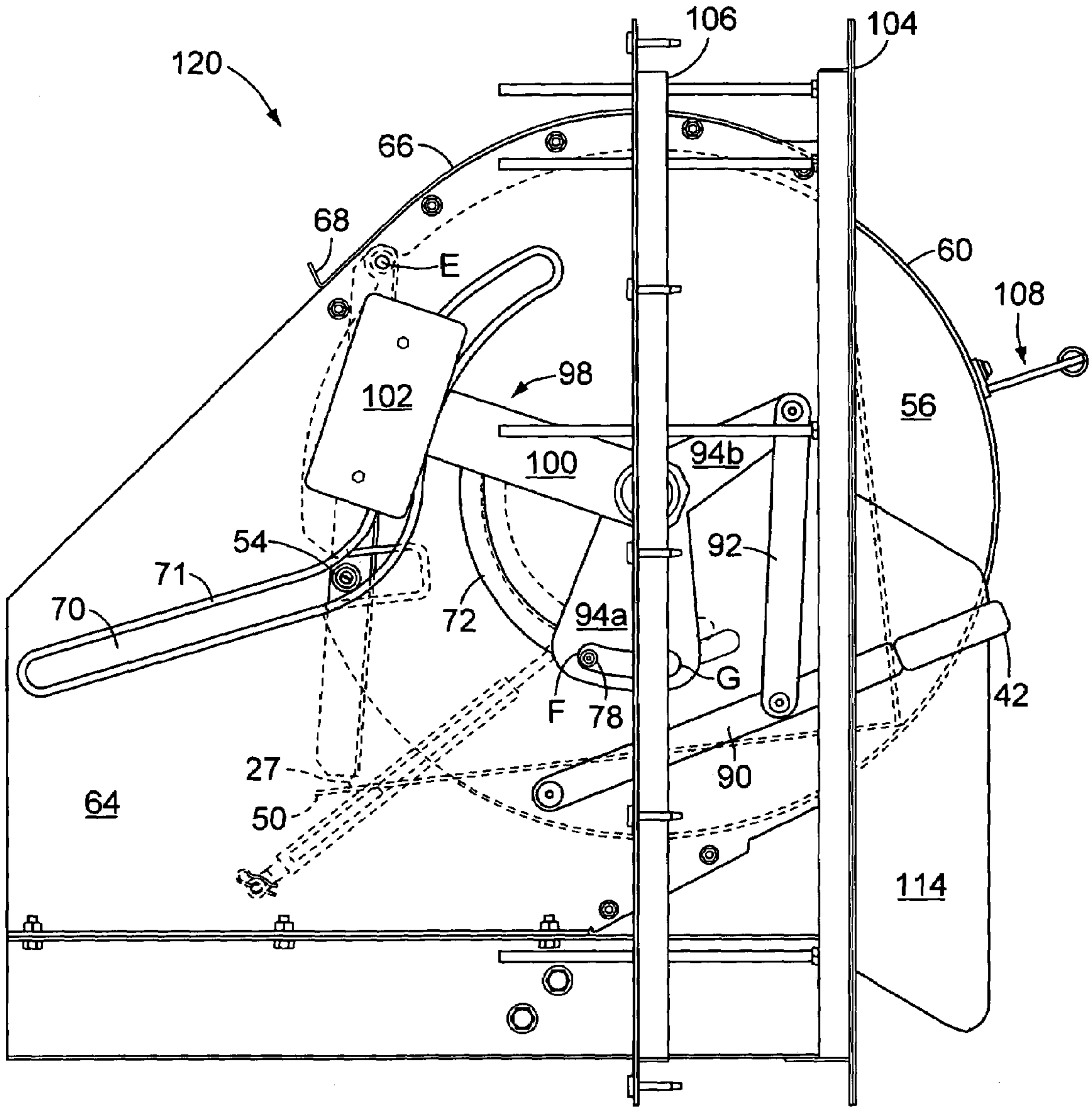
FIG. 13 illustrates a left-side view of the embodiment illustrated in FIG. 9, at the point in the upward stroke of handle 42 where cover 60 first eliminates opening 25.
Figure 14:
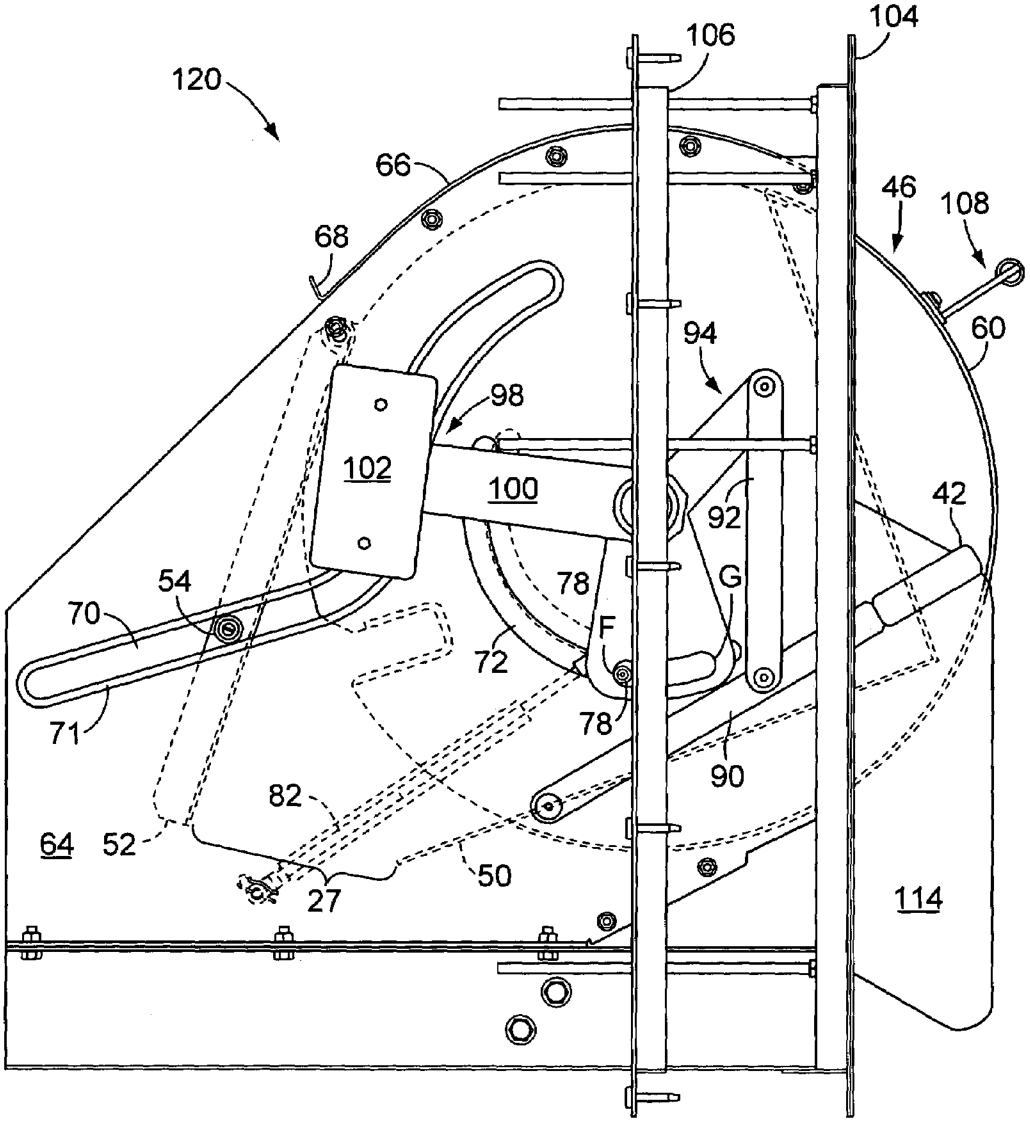
FIG. 14 illustrates a left-side view of the embodiment illustrated in FIG. 9, at the upper most point in the upward stroke of handle 42, but before bin 46 continues to rotate to the fully closed position.
Figure 15:
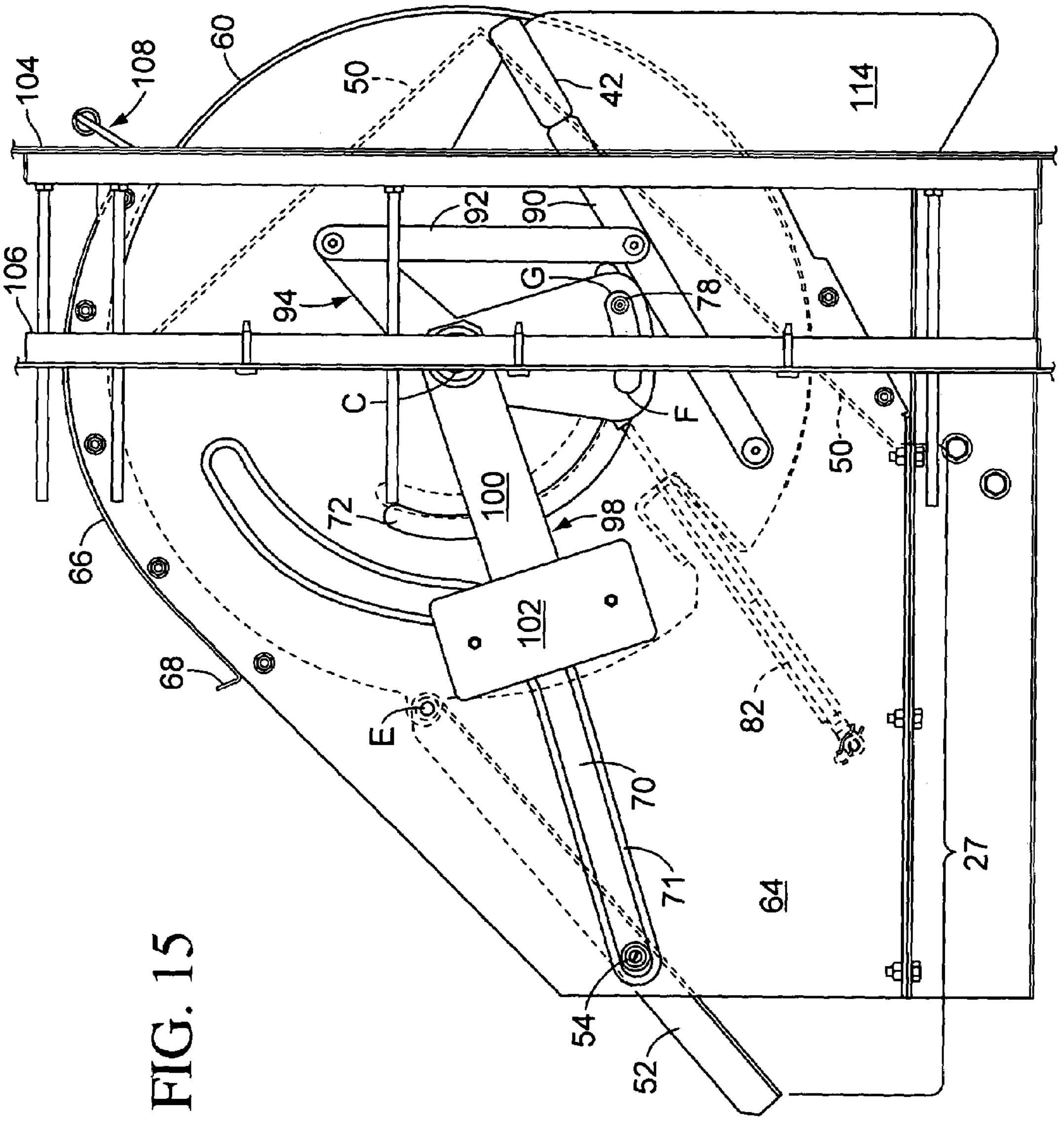
FIG. 15 illustrates a left-side view of the embodiment illustrated in FIG. 9 at its fully closed position after bin 46 has rotated CCW an additional 25 degrees from its depicted position in FIG. 14.

When input lever 90 reaches its top-most position in slot 36*c*, the components of parcel drop 40 are as illustrated in FIGS. 7 and 14. Then as a result of the rotation, gravity, and the force exerted by constant force spring 82 on spring pin 86, counterweights 98 and bin 46 continue to rotate counterclockwise another 25 degrees, placing bin pin 78 in contact with point G at the other end of slot 96 as shown in FIGS. 7 and 15. FIGS. 11-15, while illustrating another embodiment consistent with the invention, best illustrate the positions of the moving components through this closing motion.

Patrons may also open and close parcel drop by directly rotating cover 60 or bin 46. This may be accomplished by using a handle 108 attached to cover 60. An embodiment of handle 108 may be formed in part by a bar member 110, preferably round stock whose diameter is easy to grip in a human hand. Bar member 110 may be connected at each end by two structural members 111 and 112 that attach to cover 60 and position bar member 110 parallel to the axis of rotation of cover 60, but at a distance away from cover 60 sufficient to allow a patron's gloved hand to comfortably grasp bar member 110. The length of bar member 110 may vary, but preferably may be a substantial fraction of the width of chute 50 and corresponding width of cover 60. In the illustrated embodiments, bar member 110 is 13.81 inches long.

The circumferential placement of handle 108 on cover 60, relative to where section 50*b* of chute 50 attaches to cover 60, may affect the maximum size of opening 25 or of opening 27, by limiting the rotation of bin 46. In the illustrated embodiments, handle 108 is located approximately 32 degrees from the connection of section 50*b* of chute 50 and cover 60. This particular placement, on this embodiment, does not limit the designed rotation of bin 46. However, if another placement is used, to prevent a handle attached to cover 60 from hitting front wall 36 or 104, housing 66 may be extended placing flange 68, acting as a stop, into contact with portion 50*a* of chute 50 earlier in the rotation. Such a stop, if installed on the embodiments described herein, will reduce the rotation of bin 46 as parcel drop 40 opens. Moreover, in such embodiments, a strip of compressible material may be placed at the upper edge of opening 36*b* or 104*b* to provide an object not likely to seriously injure a patron and still reduce the size of any gap between the edge of cover 60 to prevent easy access, should a patron wrap his or her fingers on the edge of cover 60 in order to rotate bin 46.

As previously described, housing plate 64 contains trap door roller slot 70, lining 71, first pin slot 72, and handle lever mounting shaft 76. As is most clearly shown in FIG. 4, trap door 52, as here embodied, has a trap door roller 54 attached at point D. Trap door roller slot 70 may consist of three integral sections, all three of which in this embodiment are an inch wide. The first section, as here embodied, is an approximately 60-degree, front-facing arc at a center line radius of 7.16 inches. The center of the first section's arc is the point C on housing plate 64. The first section may blend into the second section, which, in this embodiment, is an approximately 70-degree, rear-facing arc of center-line radius 3.50 inches. The center of the second section's arc, as here embodied, is a point that is 10.65 inches to the left of point C and 0.46 inches above it. The second section may blend into the third section, which in this embodiment is an approximately 8 inches long straight section, at a 15 degree angle from horizontal.

During operation and as here embodied, trap door 52 rotates about point E. As shown in FIG. 4, roller 54, rests against an edge of a slot 55 in each end plate 56 when in the fully open position of parcel drop 40. The edge of each slot 55 in end plates 56 preferably has a grommet edging. In other words, the edge of the slot 55 may be covered by material other than that which forms the end plate 56. As parcel drop 40 rotates between fully open and fully closed, roller 54 rolls along an edge of slot 70 as illustrated in FIGS. 5, 6, 7, 8, and 9-15. All three sections of slot 70 may have a lining 71 to affect the force or wear of roller 54 on slot 70. Lining 71 is preferably a wear-resistant material.

Figure 12:
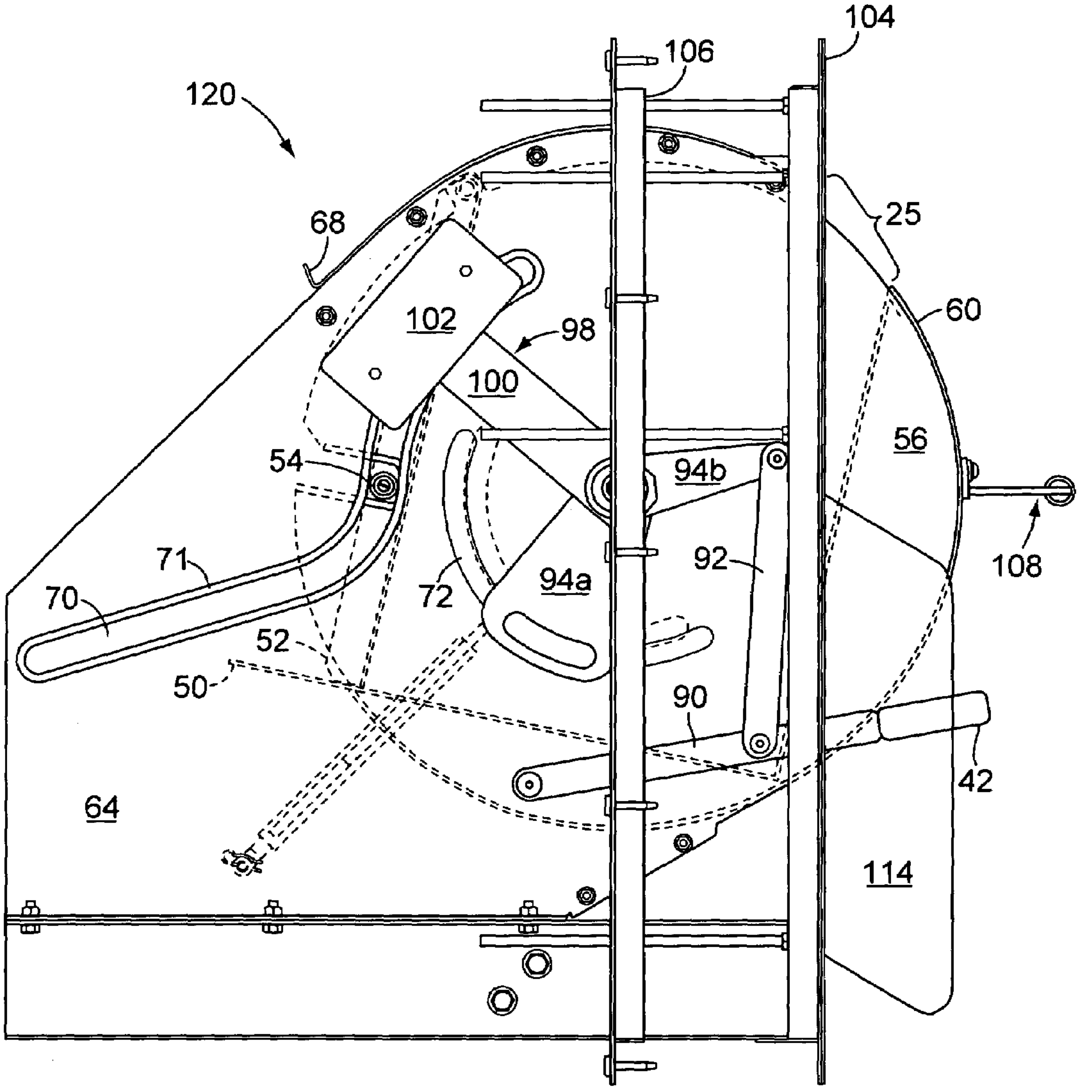
FIG. 12 illustrates a left-side view of the embodiment illustrated in FIG. 9, at the point in the upward stroke of handle 42 where trap door 52 begins to rotate away from chute 50 and create opening 27 in bin 46.

As best illustrated in FIGS. 11-15, trap door 52 rotates clockwise partway around point E and away from chute 50 as roller 54 follows the path of slot 70 as parcel drop 40 operates between fully open to fully closed. As illustrated in FIGS. 11 & 12, trap door 52 stays in position as a back wall of bin 46 for the first 58 degrees of rotation of bin 46 as roller 54 moves through section one. As illustrated in FIGS. 12 & 13, as roller 54 moves into the second section of slot 70 trap door 52 begins its rotation about point E, creating opening 27. As illustrated in FIGS. 13-15, as roller 54 moves out of the second section and through the third section, opening 27 becomes larger. The parcel collection box 20 may thus maintain the security of parcels already inside parcel collection box 20 by retaining the closed structure of bin 46 while opening 25 still is large enough to accommodate an arm or some implement that could reach the interior and remove a deposited parcel (see FIGS. 11 & 12). Before handle 42 reaches the maximum height permitted by slot 104*a*, the front edge of cover 60 has rotated to eliminate opening 25, preventing easy access to the interior of housing 62 through opening 104*b*. This may be seen in FIGS. 13 and 17. At that time, in this embodiment, opening 27 is a narrow slit as illustrated in FIG. 13. When handle 42 reaches the maximum height permitted by slot 104*a*, the front edge of cover 60 has rotated into the interior of housing 62 and opening 27 is larger. This is illustrated in FIG. 14. In the fully closed position, bin 46 has rotated even further in housing 62 and opening 27 is at its largest. FIG. 15 illustrates this position.

In FIGS. 6 and 15, chute 50 has rotated counter clockwise around point C, tilting the longer section of chute 50 with the high point in the front and the low point in the back, on which patron-deposited parcels may slide down and then fall through opening 27 into the interior of self service platform, parcel collection box 20. Another view of opening 27 may be seen in FIG. 16. Bin 46 in the "fully closed" position of parcel drop 40 does not have a back wall. When significant access to the interior of parcel collection box 20 exists from bin 46 (through opening 27 created by rotation) cover 60 prevents access from outside the parcel collection box 20 by blocking opening 36*b* and eliminating opening 25.

Parcel collection box 20 may be designed to securely collect parcels twenty-four hours a day, seven days a week in postal service center lobbies. To increase the security of deposited parcels, structural frame 21 may be constructed as an integral piece. As here embodied, base 22 and top structure 30 are contiguously connected to back 24 (shown in FIG. 2), left sidewall 26 and right sidewall 28 (shown in FIG. 2) and front wall 36. Door 38 may be hinged, lockable, and sized to cover first opening 36*a* through which deposited parcels may be removed by authorized personnel. Although shown unlocked and open in FIG. 1, door 38 remains closed and locked, except when unlocked and opened by authorized personnel. Directly in front of opening 36*c*, rests handle 42. As here embodied, handle 42 is fixedly connected to a lever (shown in FIG. 5), which extends through opening 36*c*, a 0.312 inch wide slot, sized to allow 11 inches of vertical travel and yet not allow easy access into the interior of parcel collection box 20.

Other components also may assist in securing the deposited parcels. A part of parcel drop 40 protrudes from front wall 36, through opening 36*b*. As here embodied, cover 60, which is sized such that the outer cylindrical surface of cover 60 is always spaced close to the bottom edge of the rectangular second opening 36*b* in front wall 36 during rotation. As mentioned above, when significant access to the interior of parcel collection box 20 exists from bin 46 (through opening 27 created by rotation) cover 60 prevents access from outside the parcel collection box 20 by blocking opening 36*b* and eliminating opening 25. Additionally, end plates 56, shown in FIGS. 2-4, are contiguously connected to the left and right edges of cover 60, and are also spaced close to the left and right edges of opening 36*b* throughout the operation of parcel drop 40. As here embodied, the gap is 0.185 inches on each side. When opening 25 does exist, upper housing support 66 may serve to limit access to the interior of parcel collection box 20, improving its ability to securely collect parcels. As here embodied, it is spaced close to the perimeter of end plates 56. As here embodied, trap door roller 54 and trap door roller slot 70, also improve the ability to securely collect parcels, because they prevent trap door 52 from being rotated away from chute 50 at that time and by retaining the closed structure of bin 46 when opening 25 still is large enough to accommodate an arm or some implement that could reach the interior and remove a deposited parcel. Thus designed, the access to the interior of parcel collection box 20 is limited to these gaps and slot 36*c*, when door 38 is closed and locked.

Other operational-safety considerations may be installed. A vertical plate 114, preferably shaped as a parallelogram with rounded corners, may be attached to front wall 36 or 104 between the left edge of opening 36*b* or 104*b* and the right edge of handle 42. Plate 114 may prevent a patron's hand or arm from being struck by the rotating bin 46 during the stroke of handle 42 in opening or closing parcel drop 40.

FIG. 7 illustrates another embodiment consistent with the invention. Depicted in FIG. 7 is a parcel drop wall unit 120, for mounting in an opening of a wall in a postal service center accessible to patrons. Parcel drop wall unit 120 comprises parcel drop 40 and mounting brackets and hardware. Thus many components are the same as in parcel collection box 20, are labeled with the same number, and will not be described again. New components are front mounting bracket 104 containing vertical slot 104*a* through which input lever 90 protrudes, rectangular opening 104*b* through which bin 46 protrudes, and back mounting bracket 106.

Figure 8:
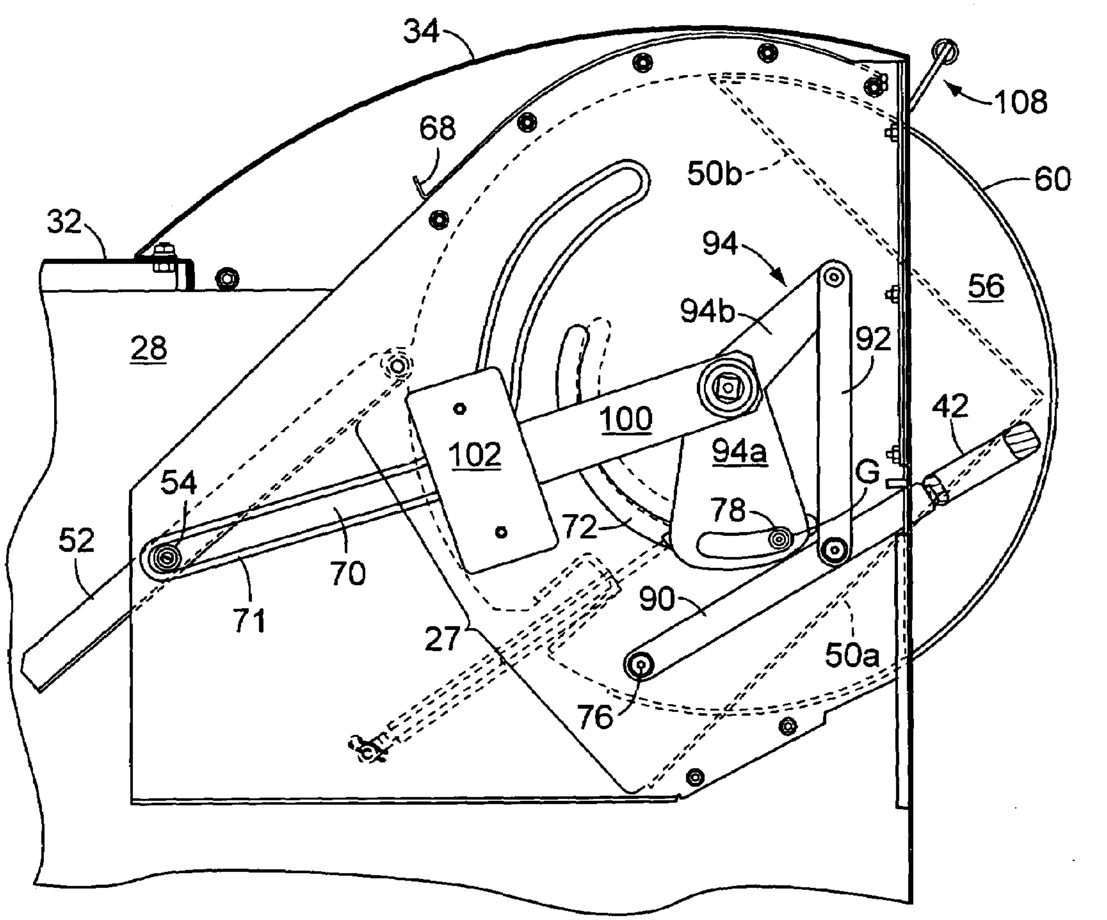
FIG. 8 illustrates the same view as FIGS. 5, 6, & 7, when bin 46 has continued to rotate counterclockwise to the fully closed position of parcel drop 40.
Figure 9:
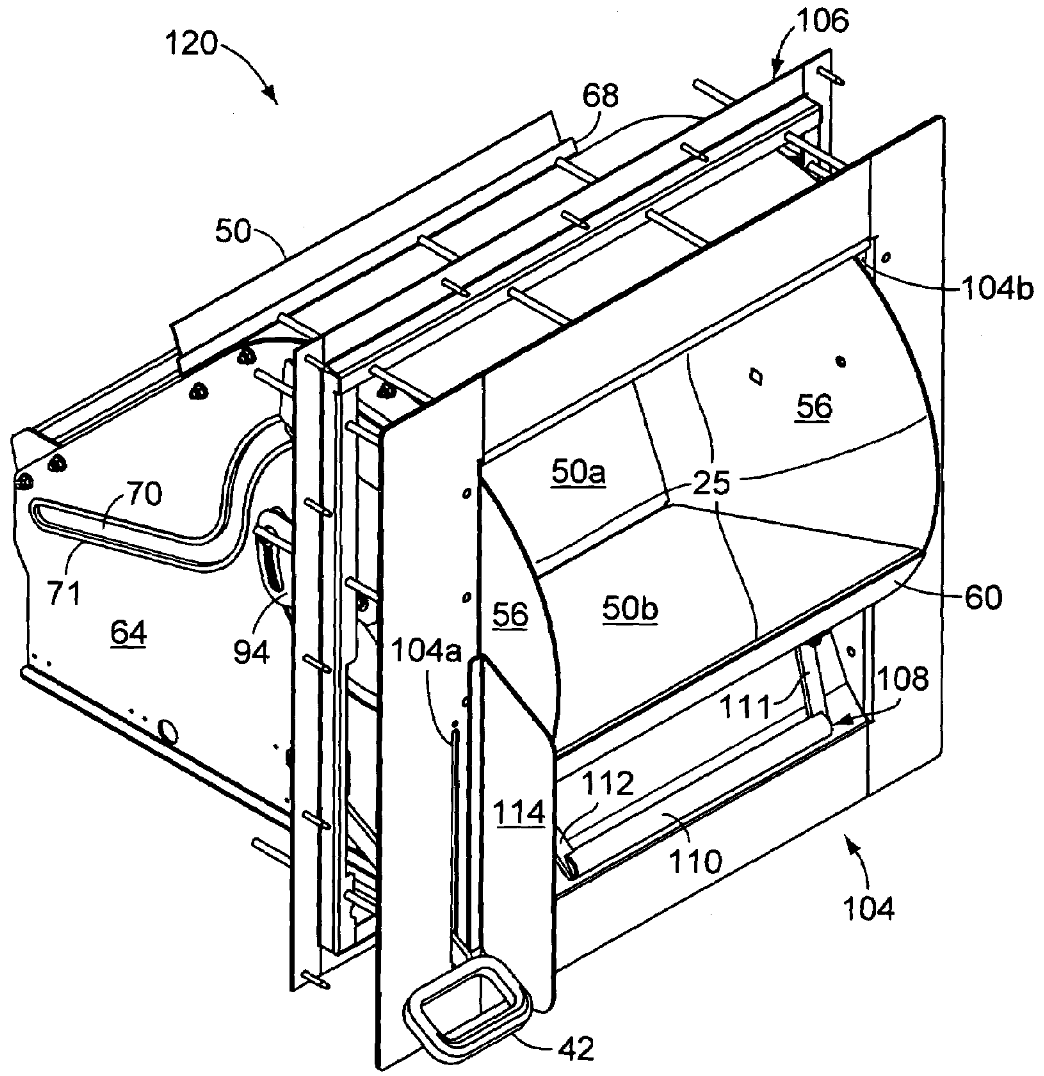
FIG. 9 illustrates a left-top-front perspective view of a parcel-collection device, embodied as a parcel drop wall unit.

FIG. 8 illustrates the right side view of parcel drop wall unit 120. The components of parcel drop 40 are the same as described in the first embodiment. Housing 62 may be connected to front mounting bracket 104, which may be bolted through a wall to back mounting bracket 106.

In this embodiment, patrons operate handle 42 to open parcel drop 40 and place parcels in bin 46, then they rotate handle 42 sixty degrees up (CCW) to close parcel drop 40. Deposited parcels slide down chute 50, through opening 27 created in bin 46 and into a parcel receptacle on the other side of the postal service center wall. As a wall exists between a person in the postal service center lobby and the deposited parcels, and the other points of access (the gaps and slot 104*a*) do not permit easy access as described with the previous embodiment, the security of the parcels from unauthorized access may be maintained.

Figure 18:
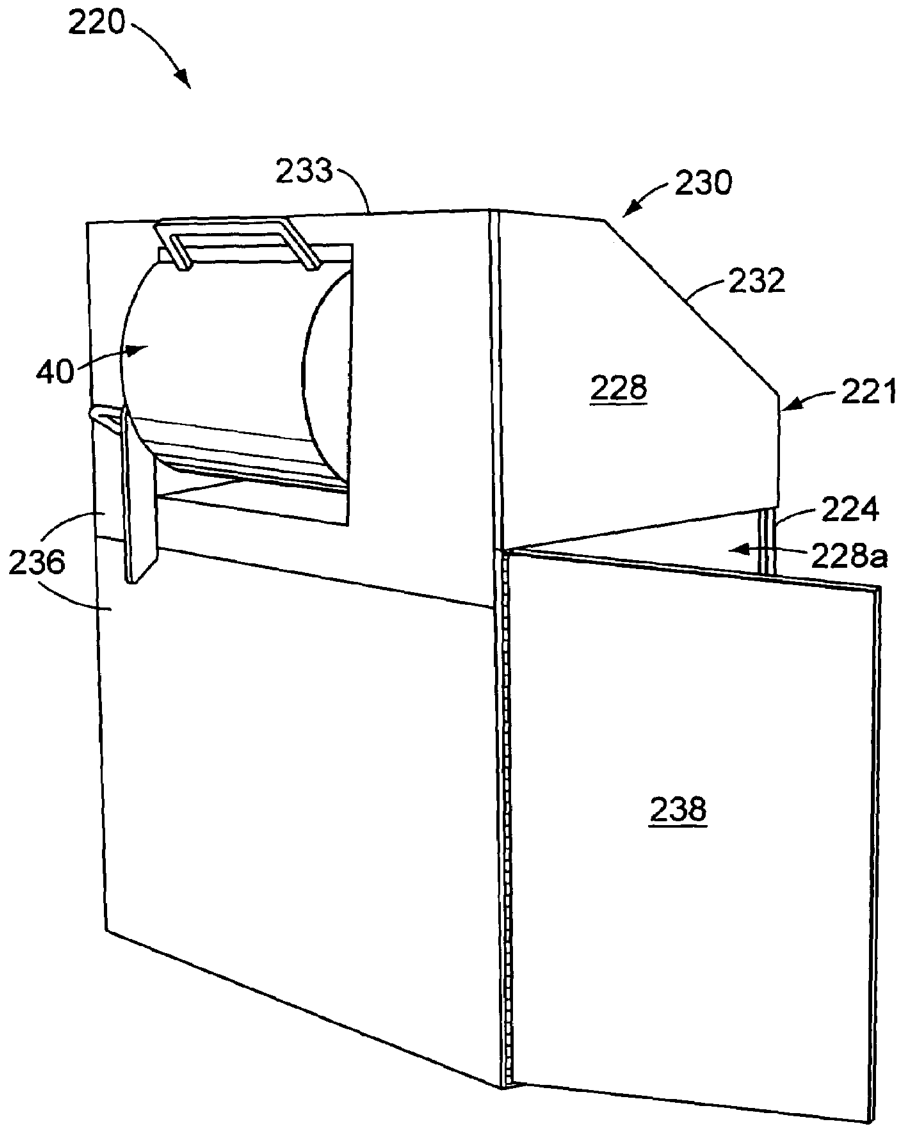
FIG. 18 illustrates a front-right-hand side perspective view of a parcel collection box designed specifically for use in external environments with a securable door on the right-hand side wall in an open position.

FIG. 18 illustrates another embodiment consistent with the invention. Depicted in FIG. 18 is a parcel collection box 220 for installation external to a delivery service center. Parcel collection box 220 comprises structural frame 221 and parcel drop 40. Many components are the same as in parcel collection box 20, are labeled with the same number, and will not be described again.

As best seen in FIG. 18, the composition of structural frame 221 differs from the structural frame 21 of FIG. 1. In this embodiment, front wall 236 is 63.656 inches high by 48.500 inches wide. In this embodiment, back wall 224 is 50.6 inches high by 48.500 inches wide. In this embodiment, base 222 (partially shown in FIG. 22) is 35 inches deep by 48.500 inches wide. In this embodiment, top structure 230 comprises two planar walls 232 and 233. In this embodiment, planar wall 232 joins side walls 226 (not shown) and 228, back wall 224, and planar wall 233. In this embodiment, planar wall 233 is horizontal and forms an interior angle with planar wall 232 of 153 degrees. In this embodiment, planar wall 233 joins front wall 236 and side walls 226 and 228 in addition to planar wall 232. In this embodiment, side wall 228 has an opening 228*a*. Door 238 is hinged and, when closed, covers opening 228*a*. As in the embodiment of FIG. 1, door 228 may be locked to prevent access to the interior of parcel collection box 220 by unauthorized persons.

Figure 19:
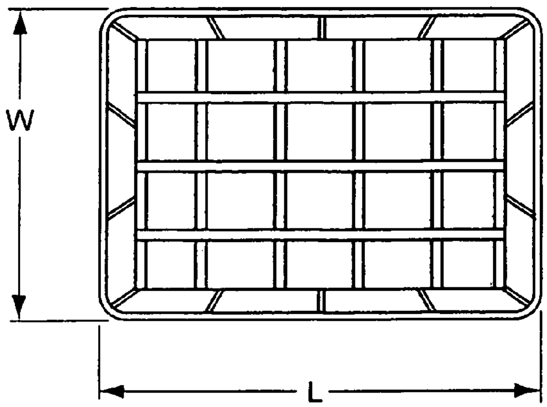
FIGS. 19, 20, and 21 are top, front, and side views of a hamper assembly for use inside the embodiment illustrated in FIG. 18.
Figure 20:
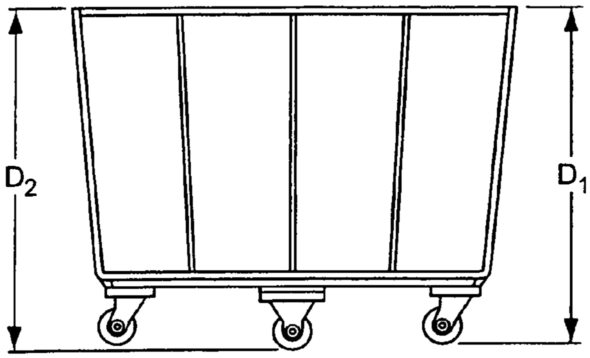
Figure 21:
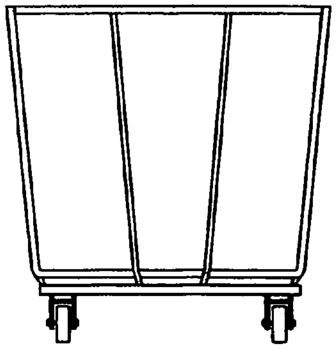

In this embodiment, door 238 is sized to allow a receptacle to be placed into or removed from the interior of parcel collection box 220. An embodiment of the receptacle is PSIN 1046 hamper used in the standard USPS jumbo collection boxes (PSIN 1170*s*, PSIN 1170V). Top, front, and side views of hamper 150 are illustrated in FIGS. 19, 20, and 21. In this embodiment, parcels falling from chute 50 of parcel drop 40 land within hamper 150, when hamper 150 is present within parcel collection box 220. Hamper assemblies of other sizes and or construction may be used within parcel collection box 220.

In this embodiment, as in parcel collection box 20, linkage 92 may be rotatably connected to bin lever 94 by a shaft, and to input lever 90 by another shaft. In this embodiment, the distance between the two shafts in linkage 92 is 9.5 inches, as is best illustrated in FIG. 21. The distance between the two shafts may be changed to allow appropriate clearance for an internal parcel collecting bin. Linkage 92 may be any shape that retains these spatial relationships, and may be scaled to accommodate larger or smaller input motions.

In this embodiment, input lever 90 may be rotatably connected, as described above, by a shaft, to linkage 92. Input lever 90 may be also rotatably connected to housing plate 64 by lever mounting shaft 76. In this embodiment, the center axis of shaft 76 intersects housing plate 64 at a 9.87 inches radius from point C at 255 degrees counter clockwise from 0 degrees (at horizontal (3 o'clock)). Input lever 90 extends at least between the centers of shaft 76 and the shaft connecting input lever 90 to linkage 92. In this embodiment, that distance is 6.75 inches. As with input lever 90 of parcel collection box 20, input lever 90 may be longer than that distance. As with input lever 90 of parcel collection box 20, input lever 90 protrudes through slot 236*c* (shown in FIG. 16) in front wall 236, in order to provide a lever which patrons may rotate to rotate parcel drop 40. The longer the lever, the greater the moment arm and the less force required to rotate parcel drop 40. Input lever 90 may be any shape that retains these spatial relationships, and meets the ADA limits, if required.

If parcel collection boxes 20 and 220 are installed externally with respect to a building, such that precipitation may be present, water may collect in bin 46 if parcel drop 40 is left in an open position. To prevent the build up of a significant amount of liquid, such as water, in bin 46, that may then wet and damage parcels collected within parcel collection box 20 or 220, parcel drop 40 may be modified to include a drainage system. An embodiment of a drainage system 250 is illustrated in FIG. 20. Piece parts of drainage system 250 are illustrated in FIGS. 31, 32, and 33.

Figure 22:
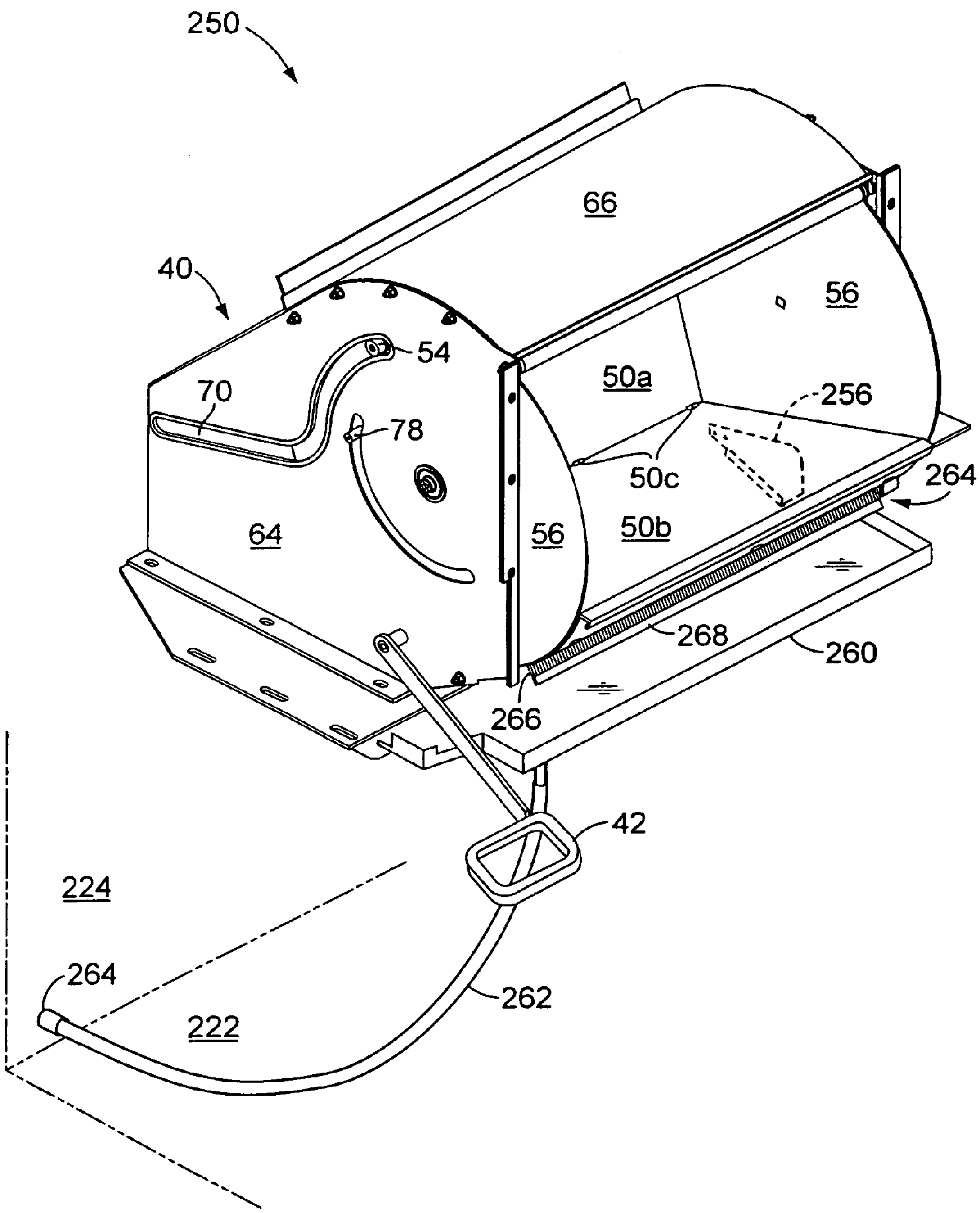
FIG. 22 illustrates a front, top, left-hand perspective view of the parcel drop with drainage system.
Figure 23:
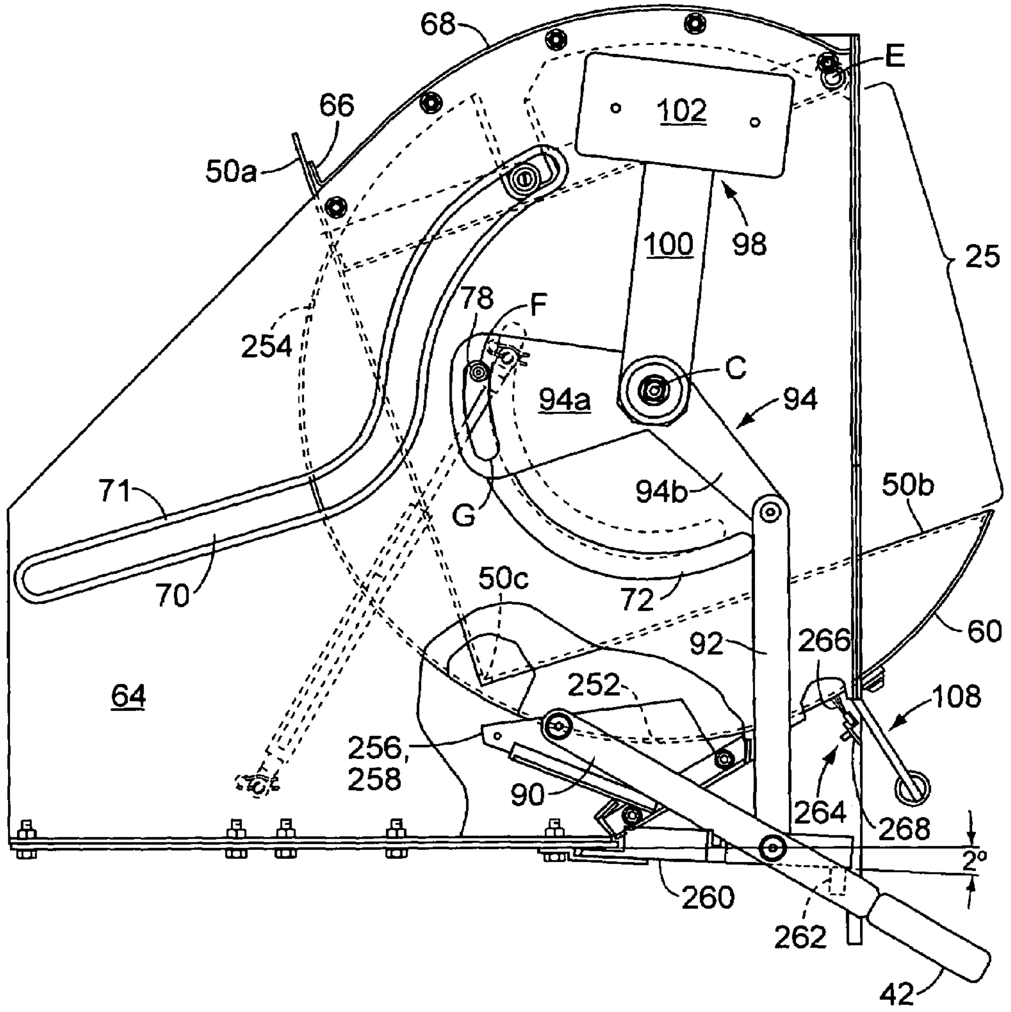
FIG. 23 illustrates a side view of the parcel drop with drainage system.

Drainage system comprises holes 50*c* in the joint of chute 50, between portion 50*a* and 50*b* that allow the liquid to pass from chute 50 to the inside of cover 60, as illustrated in FIGS. 22 and 23. Cover 60 may have holes in multiple circumferential locations. Two such locations are illustrated in FIG. 23. One set 252 of holes are at the lowest point of cover 60 when parcel drop 40 is in the fully open position. One set 254 of holes are at the lowest point of cover 60 when parcel drop 40 is in the fully closed position. Liquid from either set of holes falls in to a gutter 256 or 258, see FIGS. 22 and 23, one on each side of parcel drop housing 62, or directly into drip pan 260. The liquid in gutters 256 or 258 then falls into a drip pan 260 that may be located below each gutter 256 and 258, see FIGS. 22 and 23, and extending across the width of opening 236*b*. Drip pan 260 may be tilted with one corner lower than all others, or constructed with a point that is lower than all others in drip pan 260. At this low point, one end of a drain tube 262 may be attached, as illustrated in FIGS. 22 and 23. The other end of drain tube 262 may be attached to an opening in back wall 24, where the liquid may exit parcel collection box 20 or 220, as illustrated in FIG. 22.

Liquid, such as water, that collects on the outside of cover 60 may accumulate and roll down the surface into parcel collection box 20 or 220 through the small clearance between cover 60 and front wall 36 or 236. To prevent such liquid from wetting and damaging the parcels collected in parcel collection box 20 or 220, a liquid collection unit 264 may be installed in a parcel collection box. An embodiment of a liquid collection unit is illustrated in FIGS. 22 and 23. In this embodiment, a brush 266 and holder 268, see FIG. 23, is mounted on structural frame 21 or 221 or other stationary structure within parcel collection box 20 or 220, such that it is in contact with the outer surface of cover 60. In this embodiment, liquid that runs down cover 60 contacts brush 266 and flows down it and into drip pan 260, which is mounted below brush 266. It additionally may collect liquid that has yet to run down cover 60 as cover 60 is rotated past brush 266 during use by a patron.

Figure 24:
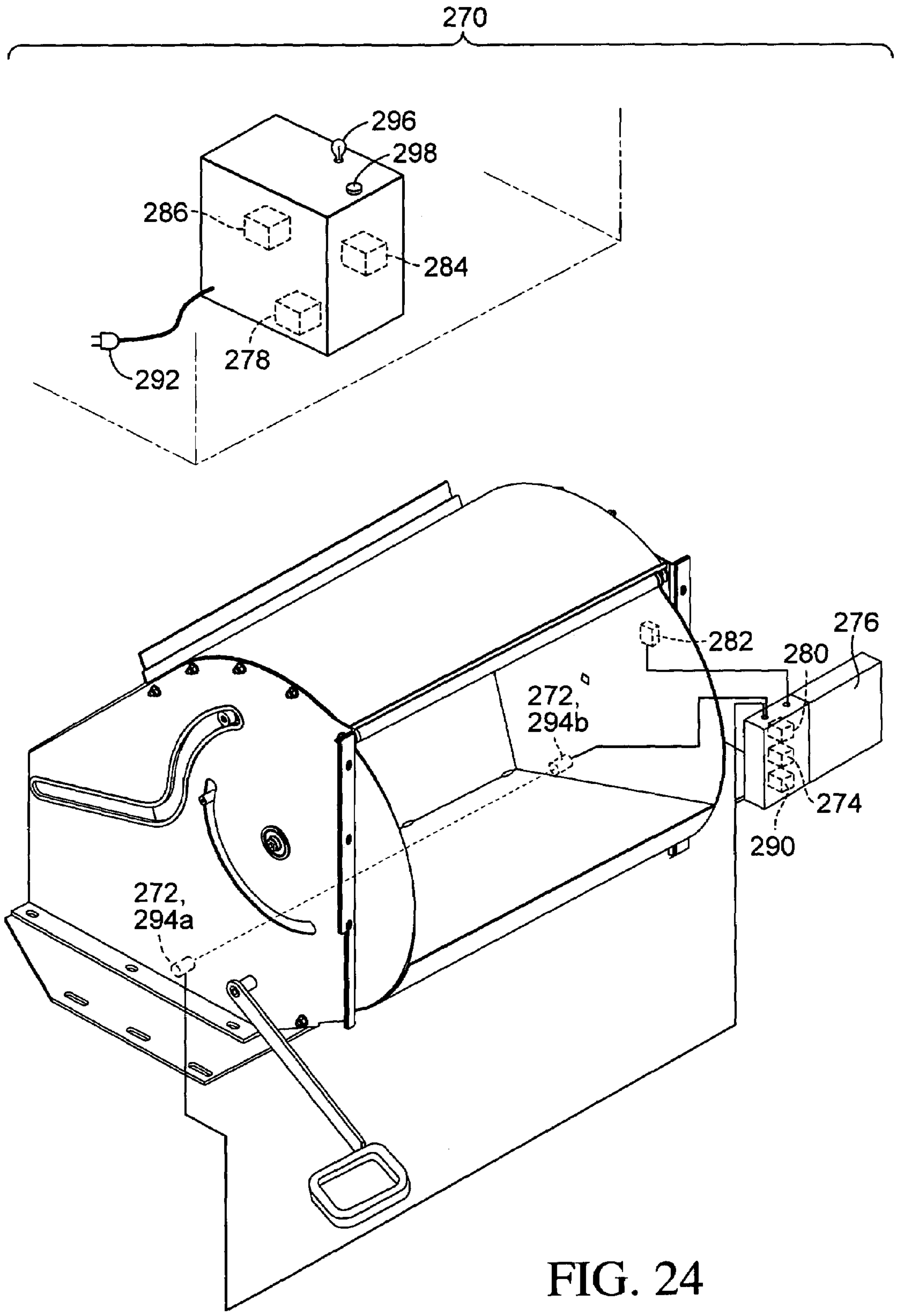
FIG. 24 illustrates an embodiment of an alarm system to sense and indicate when a remotely located parcel collection device has a predetermined level of parcels within it.

If installed in a remote location, an optional alarm system 270 to sense and indicate when a parcel collection point of use has a predetermined level of parcels within it. An embodiment of such an alarm system is illustrated in FIG. 24. Components of alarm system 270 may include a parcel height sensor 272, a transmitter 274, a programmable controller 276, a timer relay 278, a delay on timer 280, a magnetic reed switch 282, a magnetic actuator 284, a receiver 286, an indicator 288, and two power sources 90 and 92. These are standard industry components and need not be specifically described.

In this embodiment, a parcel height sensor 272 comprises a light beam sensor 294, which transmits and receives a horizontal light beam at a predetermined location, if the beam is not broken or blocked by an object. Considerations of placement of parcel height sensor 272 include the path parcels follow when exiting parcel drop 40 or 40, and the height (which then determines volume) at which "box full" indicator 288 should be activated to communicate to an authorized person to remove the parcels from within the parcel collection box 20 or 220, to allow continued collection from patrons. Light beam sensors with associated controllers are well known in the art and need not be specifically described. One such system is from Optex. In this embodiment, alarm system 270 will not transmit a signal to activate indicator 288 each time the light beam is broken or blocked, but only when the beam is not received for a predetermined length of time that indicates that the object preventing the reception of the beam is "permanently" located rather than just falling from parcel drop 40 or 40. In this embodiment, that functionality is provided by a programmable controller, a control program, a timer relay 278, a delay on timer 280, a magnetic reed switch 282, and a magnetic actuator 284. In this embodiment, a 12V DC battery is the power source 90. In this embodiment, power is thus supplied to light beam sensor controller when timer relay 278 is activated, thus activating light beam sensors 294*a* and 294*b* (see FIG. 24). In this embodiment, when the beam is interrupted, the controller sends a signal to delay-on relay 280. In this embodiment, timer relay 278, powered by 12 V DC battery 90, with range 1-60 minutes, supplies power to the system for a predetermined amount of time when magnetic switch 282 is activated. In this embodiment, when delay-on timer 280 is activated, it delays the signal being sent to transmitter 274 for a predetermined amount of time. In this embodiment, this allows sensors 294*a* and 294*b* to be momentarily interrupted. In this embodiment, magnetic reed switch 282, powered by 12V DC battery 90 triggers timer relay 278 when the parcel drop bin is rotating. In this embodiment, magnetic actuator 284 triggers magnetic reed switch 278. In this embodiment, transmitter 274, which is also powered by 12V DC battery 90, sends an RF signal to receiver 286 when activated by delay-on relay 280.

In this embodiment, in the building, a 12V DC power supply 292 plugs into standard 120V AC wall outlet and converts it to 12V DC. In this embodiment, receiver 286, powered power supply 292, receives the RF signal from transmitter 274 and actuates another timer relay 278. In this embodiment, the other timer relay 278 is coupled to two indicators 288. In this embodiment, one indicator 296 is an LED and the other indicator 298 is an electronic buzzer, both powered by the power supply 292. LED indicator 296 and electronic buzzer 298 actuate when the other timer relay 278 is active.

When alarmed, in this embodiment, by either flashing red LED 296 or electronic buzzer 298, an authorized person may remove collected parcels from parcel collection box 20 or 220 through opening 38*a* or 228*a*. Once the light beam is again received, alarm system 270 is reset and indicators 296 and 298 are deactivated.

The above-described parcel collection devices, and particularly the embodiment of FIG. 16, may be used to accept parcels deposited for delivery in conjunction with payment methods other than in person at a drop off building. Parcels with postage from online programs of the U.S.P.S., such as, Click-n-Ship, PC Postage, may be used in conjunction with these embodiments. Parcels containing prepaid merchandise returns may also be deposited in self-service platform, parcel collection device, such as parcel collection box 20, wall unit 120, or box 220. It can handle packages from usps.com, Click-N-Ship, PC Postage, Postage Meter, and Merchandise Return. The device may be Aviation Mail Security and ADA compliant.

Other embodiments consistent with the invention will be apparent to those skilled in the art from consideration of the specification and practice of the invention disclosed herein. For example, the size and shape of the opening in which to deposit parcels may be freely designed, and when the ADA requirements change or are not required, the design of the four bar mechanism to link the handle motion to the bin rotation may be changed. Alternatively, a motor, powered by building electricity or sunlight (in the right environments), with an open and close button located on an external surface replacing the handle, may replace the four-bar (or other) mechanism and counterweights and an assisting force as herein provided by the constant force spring. The added benefit of a mechanical mechanism is that it requires no internal energy to function, but can operate with a patron providing the rotation of the input lever, saving energy and allowing implementation in external situations where alternate sources of power are not feasible or cost-effective. It is intended that the specification and examples be considered as exemplary only, with a true scope and spirit of the invention being indicated by the following claims.

What is claimed is:

1. An apparatus for receiving parcels comprising:

a structural frame; and a parcel drop, having a fully open and a fully closed position, comprising a bin, a first and second stationary housing member, wherein the first and second housing members are coupled to the structural frame; and a mechanism comprising:

an input lever, a link, and a bin lever, wherein:

the mechanism is connected to the bin and the first housing member and adapted to create a first variable-sized opening between the bin and the structural frame through which patrons may deposit parcels into the bin at least when the parcel drop is in the fully open position, the input lever is rotatably connected to the first housing member and the link, the link is rotatably connected to the input lever and the bin lever, the bin lever is rotatably connected to the link, the bin and the first housing member, such that the bin rotates up to 90 degrees for 60 degrees of rotation of the input lever, and the bin comprises a second variable-sized opening through which deposited parcels may fall out of the bin at least when the parcel drop is in the fully closed position.

2. The apparatus of claim 1, wherein the parcel drop further comprises at least one counterweight fixedly connected to the bin, a slot in the bin lever that allows a predetermined number of degrees of rotation to occur between the bin and the bin lever, and a constant force spring rotatably attached to one of the first and second housing members.

3. The apparatus of claim 2, wherein the constant force spring comprises a gas spring.

4. The apparatus of claim 1, wherein the bin comprises a trap door having a trap door roller on at least one side edge closest to a housing member, and a slot in the housing member, wherein the trap door roller travels as a result of the input lever's motion.

5. The apparatus of claim 1, further comprising a system for communicating the level of parcels in the structural frame.

6. The apparatus of claim 5, wherein the system comprises:

a parcel level sensor disposed on a stationary portion of the parcel receiving apparatus;

a transmitter coupled to the parcel level sensor;

a receiver externally disposed with respect to the structural frame; and at least one indicator coupled to the receiver; the indicator being activated when a predetermined level of parcels are placed in the bin.

7. The apparatus of claim 6, wherein the receiver and the at least one indicator are disposed within a building and the parcel receiving apparatus is disposed externally to the building.

8. The apparatus of claim 6, wherein the at least one indicator comprises a light emitting diode.

9. The apparatus of claim 6, wherein the at least one indicator comprises a buzzer.

10. The apparatus of claim 6, wherein the parcel level sensor comprises a light beam receiver and a light beam transmitter.

11. An apparatus for receiving parcels comprising:

a structural frame; and a parcel drop coupled to the structural frame, the parcel drop comprising a bin and a bin rotating mechanism, the bin rotating mechanism comprising a handle external to the structural frame and requiring no more than five pounds of force when tangentially applied in the direction of rotation to rotate in either direction, and wherein:

the parcel drop and the structural frame are adapted to prevent direct access into the interior of the structural frame from unauthorized persons;

the structural frame comprises a wall having a first and second opening;

the bin rotating mechanism further comprises an input lever coupled to the handle, wherein the input lever extends through the second opening;

the parcel drop further comprises a cover coupled to the bin, wherein a portion of the bin and cover protrude from the first opening and the cover and bin are sized to leave narrow gaps between themselves and the nearest edges of the first opening, such that when the parcel drop is rotated to a fully open position, the first opening is reduced in size to the opening formed between the edge of the cover and the top edge of the first opening and the narrow gaps and when the bin is rotated to a fully closed position, the cover and bin fill the first opening completely except for the narrow gaps; and the second opening is sized to allow for predetermined vertical travel of the input lever extending through the second opening.

12. The apparatus of claim 11, wherein the structural frame comprises a front wall and the handle extends no more than four inches from the front wall of the structural frame.

13. The apparatus of claim 11, wherein the parcel drop may receive parcels up to 12 by 14 by 20 inches in dimension.

14. The apparatus of claim 11, wherein the apparatus rests on a surface and the handle is no more than 48 inches from the surface on which the apparatus rests.

15. The apparatus of claim 11, wherein the apparatus rests on a surface and a parcel must be lifted no more than 48 inches from the surface on which the apparatus rests to deposit the parcel into the bin.

16. The apparatus of claim 11, further comprising a system to alert authorized persons that a predetermined level of parcels is within the parcel receiving apparatus.

17. The apparatus of claim 16, wherein the system comprises:

a parcel level sensor disposed on a stationary portion of the structural frame;

a transmitter coupled to the parcel level sensor;

a receiver externally disposed with respect to the structural frame; and at least one indicator coupled to the receiver; the indicator being activated when a predetermined level of parcels are placed in the bin.

18. The apparatus of claim 17, wherein the receiver and the at least one indicator are disposed within a building and the parcel receiving apparatus is disposed externally to the building.

19. The apparatus of claim 17, wherein the at least one indicator comprises a light emitting diode.

20. The apparatus of claim 17, wherein the at least one indicator comprises a buzzer.

21. The apparatus of claim 17, wherein the parcel level sensor comprises a light beam receiver and a light beam transmitter.

22. The apparatus of claim 11, wherein the parcel drop further comprises an upper housing support disposed close to the perimeter of the top of the bin.

23. The apparatus of claim 11, wherein the bin of the parcel drop further comprises a chute and a trap door, the trap door rotatably connected to the chute; and wherein the parcel drop further comprises a structure to limit the rotation of the trap door away from the chute.

24. The apparatus of claim 11, further comprising a drainage system, the drainage system comprising:

a liquid collector in contact with the outer side of the cover, at least one first small hole in the lowest area of the bin when the parcel drop is fully open, at least one second small hole in the cover, means to receive the liquid from the at least one second small hole and the liquid collector, a drain tube with one end connected to the liquid receiving means; and an opening in the structural frame connected to the other end of the drain tube; and wherein liquid in the bin or on the outside of the cover is drained to the outside of the parcel receiving apparatus.

25. The apparatus of claim 11, further comprising a drainage system, the drainage system comprising a liquid collector in contact with the outer side of the cover, at least one first small hole in the bin, at least one second small hole in the cover, a drip pan to receive the liquid from the at least one second small hole and the liquid collector, a drain tube with one end connected to an opening in the drop pan; and an opening in the structural frame connected to the other end of the drain tube; and wherein liquid in the bin or on the outside of the cover is drained to the outside of the parcel receiving apparatus.

26. An apparatus for collecting parcels comprising:

a structural frame;

a parcel drop comprising two mounting plates connected to the structural frame;

a bin, rotatably coupled to the mounting plates, the bin comprising a chute, two end plates connected to the chute, and a trap door rotatably connected to each end plate;

a bin rotating mechanism comprising an input lever rotatably coupled to one of the mounting plates, a linkage rotatably coupled to the input lever and a bin rotating lever, the bin rotating lever being rotatably coupled to one of the two end plates and coupled to the bin; and a trap door rotating mechanism comprising a shaped slot in at least one of the two mounting plates and a pin connected to the trap door and contacting at least one side of the shaped slot, which controls the angle of the trap door relative to the bin.

27. The apparatus of claim 26, further comprising a system to alert authorized persons that a predetermined level of parcels is within the parcel receiving apparatus, wherein the alarm system comprises:

a parcel level sensor disposed on a stationary portion of the structural frame;

a transmitter coupled to the parcel level sensor;

a receiver externally disposed with respect to the structural frame;

at least one indicator coupled to the receiver, to the indicator being activated when a predetermined level of parcels are placed in the bin.

* * * * *

UNITED STATES PATENT AND TRADEMARK OFFICE

CERTIFICATE OF CORRECTION

PATENT NO. : 7,428,980 B2
APPLICATION NO. : 11/192044
DATED : September 30, 2008
INVENTOR(S) : Donald E. Irwin et al.

It is certified that error appears in the above-identified patent and that said Letters Patent is hereby corrected as shown below:

In claim 27, column 16, line 32, “receiver, to the” should read --receiver, the--.

Signed and Sealed this

Ninth Day of December, 2008

JON W. DUDAS
*Director of the United States Patent and Trademark Office*